US007646702B2

(12) United States Patent
Sudo

(10) Patent No.: US 7,646,702 B2
(45) Date of Patent: Jan. 12, 2010

(54) OFDM COMMUNICATION APPARATUS

(75) Inventor: Hiroaki Sudo, Yokohama (JP)

(73) Assignee: Panasonic Corporation, Osaka (JP)

( * ) Notice: Subject to any disclaimer, the term of this patent is extended or adjusted under 35 U.S.C. 154(b) by 1013 days.

(21) Appl. No.: 10/169,716

(22) PCT Filed: Nov. 14, 2001

(86) PCT No.: PCT/JP01/09935

§ 371 (c)(1),
(2), (4) Date: Jul. 9, 2002

(87) PCT Pub. No.: WO02/41548

PCT Pub. Date: May 23, 2002

(65) Prior Publication Data

US 2003/0031121 A1     Feb. 13, 2003

(30) Foreign Application Priority Data

Nov. 17, 2000  (JP) ............... 2000-351766

(51) Int. Cl.
H04J 11/00    (2006.01)
H04B 3/10    (2006.01)
H04J 1/16    (2006.01)
(52) U.S. Cl. ..................... 370/208; 370/491
(58) Field of Classification Search ............ None
See application file for complete search history.

(56) References Cited

U.S. PATENT DOCUMENTS 6,449,245 B1 *  9/2002  Ikeda et al. ............. 370/208
6,487,252 B1 * 11/2002  Kleider et al. ........... 375/260
6,618,352 B1 *  9/2003  Shirakata et al. ......... 370/203
6,801,586 B1 * 10/2004  Imamura ................ 375/340
6,810,020 B2 * 10/2004  Cho et al. .............. 370/253
6,888,789 B1 *  5/2005  Sakoda et al. ........... 370/208
6,993,083 B1 *  1/2006  Shirakata et al. ......... 375/260
7,027,464 B1 *  4/2006  Nakahara et al. ......... 370/503
2002/0090042 A1 *  7/2002  Heinonen et al. ......... 375/345
2003/0007582 A1 *  1/2003  Ghazi-Moghadam et al. .... 375/347
2005/0238083 A1 * 10/2005  Laroia et al. ............ 375/132
2006/0002452 A1 *  1/2006  Laroia et al. ............ 375/135

(Continued)

FOREIGN PATENT DOCUMENTS

EP     0553841    8/1993

(Continued)

OTHER PUBLICATIONS

Japanese Office Action dated Feb. 27, 2007 with English translation.

(Continued)

*Primary Examiner*—Gregory B Sefcheck
(74) *Attorney, Agent, or Firm*—Dickinson Wright PLLC

(57) ABSTRACT

An orthogonal frequency division multiplexing (OFDM) transmission apparatus and method generate a transmission sequence including first data, second data, and known signals such that more known signals are allocated to the first data than to the second data within the transmission sequence. The transmission sequence is OFDM multiplexed into a sequence of OFDM signals and transmitted. A receiver of the OFDM signal sequence uses the known signals for estimating transmission paths of the communicated OFDM signals and improving the reception of the data to which they are allocated.

4 Claims, 19 Drawing Sheets

U.S. PATENT DOCUMENTS

2006/0104195 A1 * 5/2006 Nakahara et al. ............ 370/203

FOREIGN PATENT DOCUMENTS

| | | |
|---|---|---|
| JP | 08331095 | 12/1996 |
| JP | 9307599 | 11/1997 |
| JP | 10327122 | 12/1998 |
| JP | 11220774 | 8/1999 |
| JP | 11284597 | 10/1999 |
| JP | 2000068972 | 3/2000 |
| JP | 2000068975 | 3/2000 |
| JP | 2000115119 | 4/2000 |
| JP | 2000236313 | 8/2000 |
| JP | 2001077789 | 3/2001 |
| JP | 2001127692 | 5/2001 |
| JP | 2001148676 | 5/2001 |
| JP | 2001339657 | 12/2001 |

OTHER PUBLICATIONS

Japanese Office Action dated Aug. 8, 2006 with English translation.
European Search Report dated Jul. 9, 2009.
T. Makabe, et al., "Adaptive Forward Subchannel Control Scheme of OFDM Mobile Communication System," Vehicular Technology Conference, IEEE VTS 50$^{th}$ Amsterdam, Netherlands, Sep. 1999, pp. 2438-2441.

* cited by examiner

OFDM COMMUNICATION APPARATUS

TECHNICAL FIELD

The present invention relates to a communication apparatus using the OFDM (Orthogonal Frequency Division Multiplexing) method (hereinafter referred to as "OFDM communication apparatus"), and more particularly to an OFDM communication apparatus that performs coherent detection.

BACKGROUND ART

In conventional OFDM communication, a transmitting-side apparatus transmits a burst unit signal such as that shown in FIG. 1, for example, to a predetermined receiving-side apparatus, as adopted in IEEE802.11 and the like, for example. As shown in FIG. 1, a burst unit signal includes guard intervals (GI), a preamble for transmission path estimation, and an information signal (data). In a burst unit signal, the transmission path estimation preamble undergoes IFFT (inverse fast Fourier transform) processing, and the information signal undergoes predetermined modulation processing and IFFT processing.

The receiving-side apparatus detects the FFT (fast Fourier transform) processing start timing by calculating a correlation value between the IFFT-processed transmission path estimation preamble and the transmission path estimation preamble in the received burst unit signal (received signal). The receiving-side apparatus then extracts the transmission path estimation preamble and information signal from the received signal by performing FFT processing on the received signal in accordance with the detected start timing. The receiving-side apparatus also performs transmission path estimation using the extracted transmission path estimation preamble, and performs information signal demodulation using the result of transmission path estimation. By this means, the receiving-side apparatus can extract a demodulated signal.

However, there is the following problem in conventional OFDM communication as described above. Namely, in conventional OFDM communication as described above, the number of symbols in a transmission path estimation preamble in a burst unit signal is fixed (in FIG. 1, one symbol).

In general, when a transmission path estimation preamble with a larger number of symbols is used on a fixed basis as a transmission path estimation preamble, the error rate characteristics of a demodulated signal obtained by the receiving-side apparatus are good. However, as a transmission path estimation preamble is not an information signal, using a transmission path estimation preamble with a larger number of symbols is equivalent to increasing the proportion of a burst unit signal occupied by superfluous information. That is to say, when a transmission path estimation preamble with a larger number of symbols is used, information signal transmission efficiency falls.

On the other hand, when a transmission path estimation preamble with a smaller number of symbols is used on a fixed basis as a transmission path estimation preamble, the proportion of a burst unit signal occupied by superfluous information is reduced, and information signal transmission efficiency is consequently improved. However, depending on conditions such as channel quality, there is a high possibility of deterioration of the error rate characteristics of a demodulated signal obtained by the receiving-side apparatus.

Thus, in above-described conventional OFDM communications, there is a problem in that it is difficult to achieve both an improvement in demodulated signal error rate characteristics and an improvement in information signal transmission efficiency.

DISCLOSURE OF INVENTION

It is an object of the present invention to implement an OFDM communication apparatus that achieves both an improvement in demodulated signal error rate characteristics and an improvement in information signal transmission efficiency.

This object is achieved by determining the number of known signals for transmission path estimation (transmission path estimation preambles) to be inserted in a transmit signal (burst unit signal) in accordance with channel quality with respect to the communicating party. More specifically, this object is achieved by estimating demodulated signal deterioration factors at the communicating party using channel quality with respect to the communicating party, and also determining the number of known signals for transmission path estimation to be inserted in a transmit signal based on the estimated deterioration factors.

BEST MODE FOR CARRYING OUT THE INVENTION

With reference now to the accompanying drawings, embodiments of the present invention will be explained in detail below.

EMBODIMENT 1

In this embodiment, a case is described where a transmission path estimation preamble (known signal for transmission path estimation) inserted in a burst unit signal is varied adaptively in accordance with channel quality.

Figure 1:
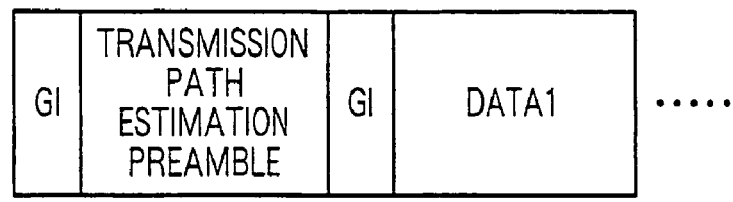
FIG. 1 is a schematic diagram showing the format of a burst unit signal used in a conventional OFDM communication apparatus.
Figure 2:
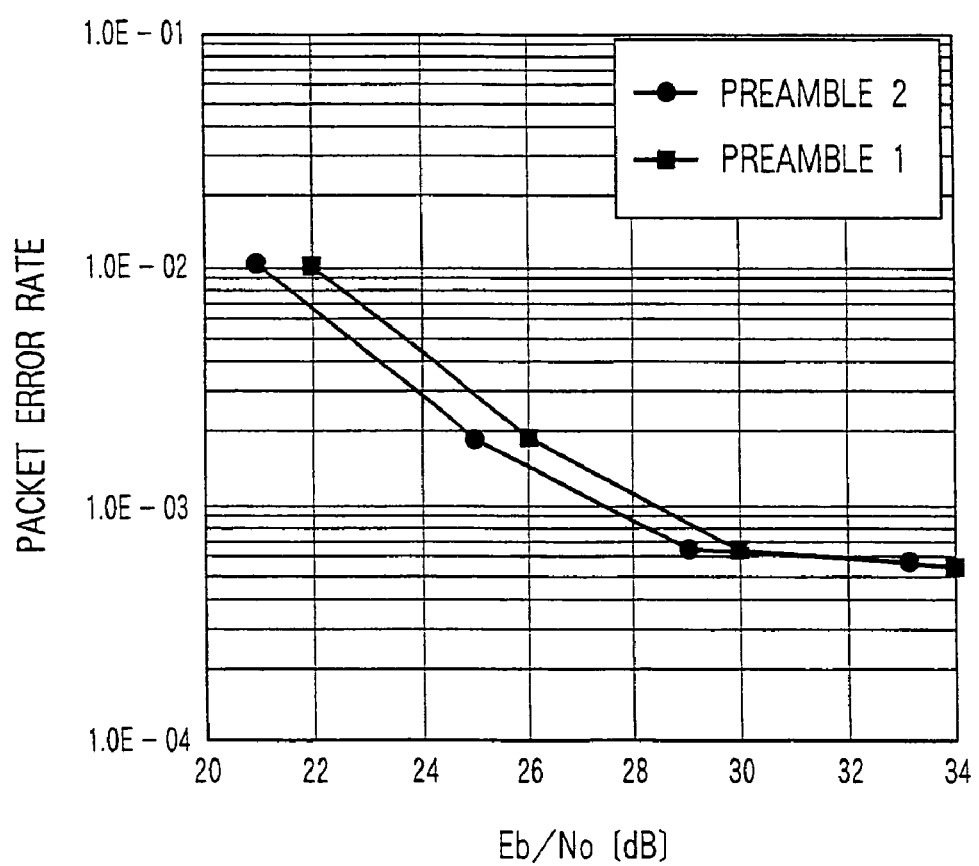
FIG. 2 is a schematic diagram showing the relationship between channel quality and demodulated signal error rate for different numbers of transmission path estimation preambles.

First, an outline of an OFDM communication apparatus according to this embodiment will be given with reference to FIG. 2. FIG. 2 is a schematic diagram showing the relationship between channel quality and demodulated signal error rate for different numbers of transmission path estimation preambles. FIG. 2 shows results of computer simulation concerning the relationship between demodulated signal error rate in a receiving-side apparatus and channel quality (Eb/No: the ratio of power necessary for transmitting a 1 bps signal to thermal noise power per Hz) for the case where the number of transmission path estimation preambles inserted in a bus is 1 and the case where the number of transmission path estimation preambles inserted in a bus is 2. The computer simulation conditions are as follows.

FFT sampling rate: 20 MHz; number of FFT samples: 64; guard interval length: 800 ns; modulation method: 16QAM; FEC: convolutional coding/Viterbi decoding (coding rate: ¾; constraint length: 7) ; maximum Doppler frequency: 50 Hz; delay variance: 150 ns As can be seen from FIG. 2, in the range up to an Eb/No value of approximately 29 dB, the Eb/No value for obtaining a predetermined packet error rate is approximately 1 dB better when the number of transmission path estimation preambles is 2 than when the number of transmission path estimation preambles is 1. That is to say, when Eb/No is 29 dB or below, the demodulated signal error rate is better when the number of transmission path estimation preambles is 2 than when the number of transmission path estimation preambles is 1. However, in the range in which the Eb/No value is approximately 30 dB or above, there is almost no difference in either case in the Eb/No value for obtaining a predetermined packet error rate. This phenomenon is due to the factors described below.

When the number of transmission path estimation preambles inserted in a burst unit signal is increased, thermal noise superimposed on each transmission path estimation preamble can be decreased in the receiving-side apparatus by averaging the transmission path estimation preambles in a received signal. Thus, with a demodulated signal obtained using a propagation path result estimated by means of a transmission path estimation preamble, deterioration due to thermal noise is suppressed, and consequently error rate characteristics are good. That is to say, increasing the number of transmission path estimation preambles inserted in a burst unit signal is effective against error rate deterioration due to thermal noise in a demodulated signal.

However, even if the number of transmission path estimation preambles inserted in a burst unit signal is increased, it is not possible to improve deterioration of error rate characteristics caused by a deterioration factor other than thermal noise (such as inter-code interference, synchronization errors, or frequency offset due to multipath propagation, for example). That is to say, increasing the number of transmission path estimation preambles inserted in a burst unit signal is ineffective against error rate deterioration due to a deterioration factor other than thermal noise in a demodulated signal.

In FIG. 2, it is clear that thermal noise is the predominant factor in error rate deterioration in the range in which Eb/No is approximately 20 dB to approximately 30 dB, and a factor other than thermal noise is the predominant factor in error rate deterioration in the range in which Eb/No is approximately 30 dB or above.

Therefore, when channel quality is within a certain approximate range (in FIG. 2, the range from approximately 20 dB to approximately 30 dB), it is possible to improve demodulated signal error rate characteristics by increasing the number of transmission path estimation preambles inserted in a burst unit signal, but when channel quality is within another certain approximate range (in FIG. 2, the range from approximately 30 dB upward), transmission efficiency falls whatever increase is made in the number of transmission path estimation preambles inserted in a burst unit signal, and demodulated signal error rate characteristics cannot be improved.

In light of the above, in this embodiment the number of transmission path estimation preambles inserted in a burst unit signal is varied adaptively in accordance with channel quality. Specifically, when channel quality is of a certain level (that is, when a factor other than thermal noise is the predominant factor in deterioration of error rate characteristics, and consequently an improvement in the demodulated signal error rate cannot be expected even if the number of transmission path estimation preambles inserted in a burst unit signal is increased), the number of transmission path estimation preambles inserted in a burst unit signal is made as small as possible (in this embodiment, "1"). Conversely, when channel quality is not good (that is, when thermal noise is the predominant factor in deterioration of error rate characteristics), the number of transmission path estimation preambles inserted in a burst unit signal is increased.

By this means, it is possible to achieve both an improvement in demodulated signal error rate characteristics and an improvement in information signal transmission efficiency.

Figure 3:
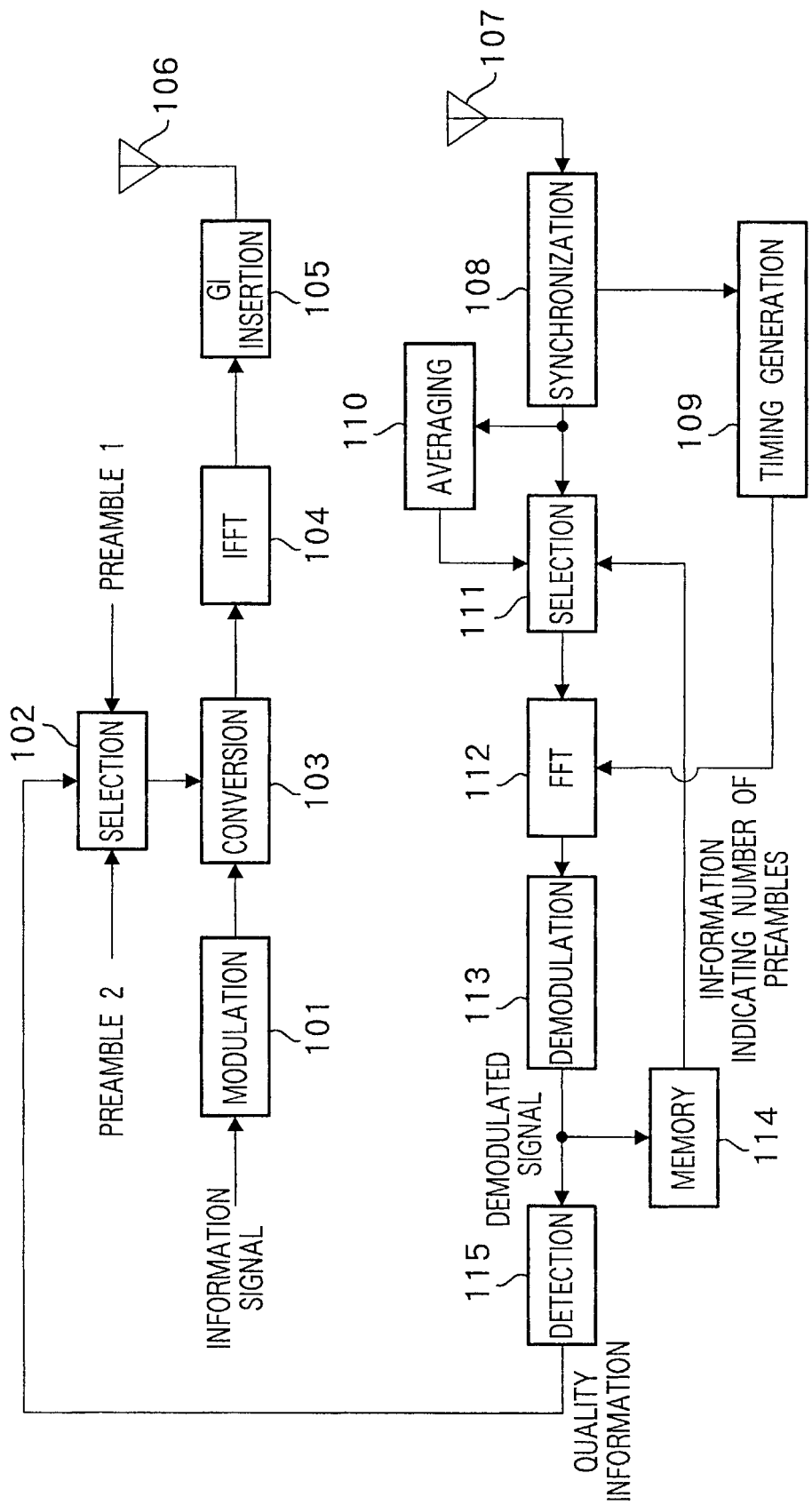
FIG. 3 is a block diagram showing the configuration of an OFDM communication apparatus according to Embodiment 1 of the present invention.

An OFDM communication apparatus according to this embodiment will now be described with reference to FIG. 3. FIG. 3 is a block diagram showing the configuration of an OFDM communication apparatus according to Embodiment 1 of the present invention. An OFDM communication apparatus according to this embodiment comprises a receiving system and a transmitting system.

In the transmitting system, a modulation section 101 performs modulation processing on an information signal, and outputs the information signal that has undergone modulation processing to a conversion section 103. Based on quality information from a detection section 115 in the receiving system described later herein, a selection section 102 outputs either transmission path estimation preamble 1 or transmission path estimation preamble 2 to the conversion section 103. As explained later herein, the quality information from the detection section 115 is information indicating the quality of a demodulated signal in the receiving system.

The conversion section 103 selects either an information signal that has undergone modulation processing by the modulation section 101 or a transmission path estimation preamble from the selection section 102, and outputs it to an IFFT section 104. The IFFT section 104 performs IFFT processing on an information signal that has undergone modulation processing and a transmission path estimation preamble from the conversion section 103 and generates an OFDM signal, and outputs the generated OFDM signal to a guard interval (hereinafter referred to as "GI") insertion section 105. The GI insertion section 105 inserts guard intervals in the generated OFDM signal and generates a transmit signal. The generated transmit signal is transmitted to the communicating party via an antenna 106.

Figure 4:
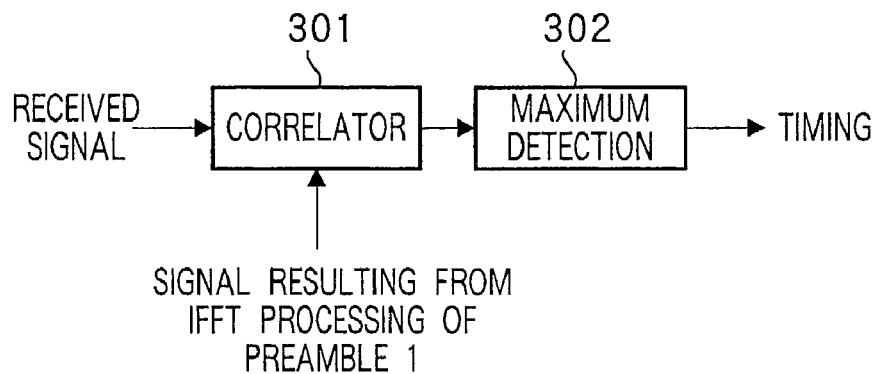
FIG. 4 is a block diagram showing the configuration of the synchronization section in an OFDM communication apparatus according to Embodiment 1 of the present invention.

Meanwhile, in the receiving system, a synchronization section 108 outputs a signal received via an antenna 107 (a received signal) to an averaging section 110 and selection section 111, and also calculates a correlation value between the received signal and the IFFT-processed transmission path estimation preamble, and detects the timing at which the calculated correlation value is at a maximum. To be specific, as shown in FIG. 4, the synchronization section 108 comprises a correlator 301 that calculates a correlation value between the received signal and IFFT-processed transmission path estimation preamble, and a maximum value detection section (maximum detection section) 302 that detects the timing at which the correlation value calculated by the correlator 301 is at a maximum. The transmission path estimation preamble in the correlator 301 has the same signal pattern as the transmission path estimation preamble to be inserted in a burst unit signal. This synchronization section 108 outputs the timing detected by the maximum value detection section 302 to a timing generation section 109.

Using the detected timing, the timing generation section 109 generates a timing signal that indicates the start timing of FFT processing in an FFT section 112, and outputs the generated timing signal to the FFT section 112 that forms part of the demodulating means.

The averaging section 110 performs averaging on the received signal from the synchronization section 108 for a 2-symbol interval, and outputs the averaged received signal to selection section 111. Based on information indicating the number of transmission path estimation preamble symbols inserted in a burst unit signal, stored in memory 114, selection section 111 outputs either the received signal from the synchronization section 108 or the averaged received signal from the averaging section 110 to the FFT section 112.

The FFT section 112 extracts the signal transmitted by each subcarrier by performing FFT processing on the received signal from selection section 111. By this means, transmission path compensation is performed based on the timing signal from the timing generation section 109. A demodulation section 113 that forms the demodulating means together with the FFT section 112 generates a demodulated signal by performing demodulation processing on the signal extracted by the FFT section 112. This demodulation section 113 outputs the generated demodulated signal to the detection section 115 and also outputs information indicating the number of transmission path estimation preambles in the demodulated signal to the memory 114. This information indicating the number of transmission path estimation preamble symbols is notified to the communicating party via a broadcast channel or the like. The memory 114 stores this information indicating the number of transmission path estimation preambles, and also outputs this information to above-mentioned selection section 111.

The detection section 115 detects the quality of the demodulated signal from the demodulation section 113, and using the detection result, generates information indicating the quality of the demodulated signal (quality information). This quality information is output to above-described selection section 102 in the receiving system.

Figure 5:
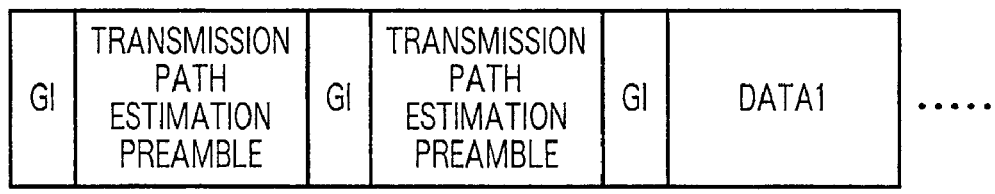
FIG. 5 is a schematic diagram illustrating a burst unit signal format used by an OFDM communication apparatus according to Embodiment 1 of the present invention (first example)
Figure 6:
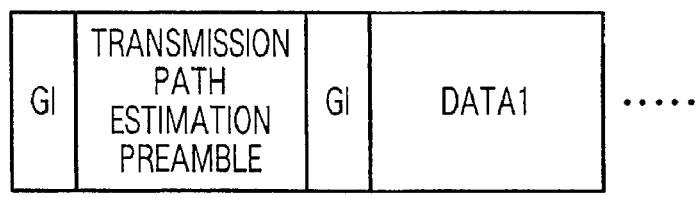
FIG. 6 is a schematic diagram illustrating a burst unit signal format used by an OFDM communication apparatus according to Embodiment 1 of the present invention (second example)

Next, the operation of an OFDM communication apparatus that has the above configuration will be described with additional reference to FIG. 5 and FIG. 6. FIG. 5 is a schematic diagram illustrating a burst unit signal format used by an OFDM communication apparatus according to Embodiment 1 of the present invention (first example), and FIG. 6 is a schematic diagram illustrating a burst unit signal format used by an OFDM communication apparatus according to Embodiment 1 of the present invention (second example).

In the transmitting system, the transmission path estimation preamble to be inserted in a burst unit signal is determined by the selection section 102 based on quality information from the detection section 115 in the transmitting system. That is to say, when the quality of a demodulated signal in the receiving system is greater than or equal to a threshold value, based on recognition of the fact that a factor other than thermal noise is the predominant factor in deterioration of the demodulated signal error rate, a transmission path estimation preamble with a smaller number of symbols (the number of symbols here being "1") is selected as the transmission path estimation preamble to be inserted in a burst unit signal. Conversely, when the quality of a demodulated signal in the receiving system is lower than a threshold value, based on recognition of the fact that thermal noise is the predominant factor in deterioration of the demodulated signal error rate, a transmission path estimation preamble with a larger number of symbols (the number of symbols here being "2") is selected as the transmission path estimation preamble to be inserted in a burst unit signal.

The threshold value used in selection section 102 can be set using channel quality at the critical point at which either thermal noise is predominant or a factor other than thermal noise is predominant as a factor in deterioration of the demodulated signal error rate (for example, Eb/No=30 dB in FIG. 2). In other words, the above-mentioned threshold value can be set using channel quality at the critical point at which demodulated signal error rate characteristics are either improved or not improved by increasing the number of transmission path estimation preambles inserted in a burst unit signal.

In this way, information indicating the number of symbols of the transmission path estimation preamble selected by selection section 102 is transmitted to the communicating party at the start of communication via a predetermined channel such as a broadcast channel or control channel, and is stored in the receiving system memory 114 at the communicating party. It is desirable for information indicating the number of symbols of the transmission path estimation preamble selected by selection section 102 to be transmitted thereafter to the communicating party via the above-mentioned predetermined channel at predetermined time intervals, and not only at the start of communication.

The transmission path estimation preamble selected by selection section 102 is output to the conversion section 103. An information signal is output to the conversion section 103 after being modulated using a predetermined modulation method (such as QPSK or 16QAM, for example).

The information signal that has undergone modulation processing by the 101, or the transmission path estimation preamble from selection section 102, is selected by the conversion section 103 and output to the IFFT section 104. Specifically, when a transmission path estimation preamble whose number of symbols is 2 is selected by selection section 102, the 2-symbol transmission path estimation preamble and the information signal that has undergone modulation processing are output sequentially from the conversion section 103 to the IFFT section 104. Conversely, when a transmission path estimation preamble whose number of symbols is 1 is selected by selection section 102, the 1-symbol transmission path estimation preamble and the information signal that has undergone modulation processing are output sequentially from the conversion section 103 to the IFFT section 104.

In the IFFT section 104, IFFT processing is performed on the transmission path estimation preamble and the information signal that has undergone modulation processing from the conversion section 103. Specifically, the transmission path estimation preamble and the information signal that has undergone modulation processing are first converted from a single-sequence signal to a plurality of sequences of signals. Furthermore, by performing IFFT processing on the signal of each sequence, an OFDM signal is generated in which the signal of each sequence is superimposed on a sequence-specific subcarrier.

The OFDM signal generated by the IFFT section 104 has guard intervals inserted by the GI insertion section 105. By this means a transmit signal is generated. Specifically, when a transmission path estimation preamble whose number of symbols is 2 is selected by selection section 102, the kind of burst unit transmit signal shown in FIG. 5 is generated. That is to say, a burst unit transmit signal is generated that contains a guard interval, a 1-symbol transmission path estimation preamble, a guard interval, a 1-symbol transmission path estimation preamble, a guard interval, and an information signal (data) comprising a predetermined number of symbols. Each transmission path estimation preamble in the burst unit signal shown in FIG. 5 has the same signal pattern.

Conversely, when a transmission path estimation preamble whose number of symbols is 1 is selected by selection section 102, the kind of burst unit transmit signal shown in FIG. 6 is generated. That is to say, a burst unit transmit signal is generated that contains a guard interval, a 1-symbol transmission path estimation preamble, a guard interval, and an information signal (data) comprising a predetermined number of symbols. It goes without saying that the transmission path estimation preambles and information signal (data) in FIG. 5 and FIG. 6 have been subjected to IFFT processing.

A burst unit transmit signal generated in this way undergoes predetermined transmission processing, and is then transmitted to the communicating party via antenna 106.

Meanwhile, in the receiving system, a signal transmitted by a communicating party is sent to the synchronization section 108 via antenna 107. The above-mentioned communicating party has the same kind of configuration as shown in FIG. 3. Therefore, a signal transmitted by the above-mentioned communicating party undergoes the processing described with reference to the transmitting system in FIG. 3. Furthermore, information indicating the number of symbols of the transmission path estimation preamble selected by selection section 102 at the communicating party is transmitted to this OFDM communication apparatus at the start of communication via a predetermined channel such as a broadcast channel, and is stored in the receiving system memory 114 in this OFDM communication apparatus.

A received signal from antenna 107 is output to the averaging section 110 and selection section 111 via the synchronization section 108. In the synchronization section 108, the correlation between the received signal and an IFFT-processed transmission path estimation preamble is calculated by the correlator 301, and the timing at which the calculated correlation value is at a maximum is detected by the maximum value detection section 302. The detected timing is output to the timing generation section 109.

Using the timing detected by the maximum value detection section 302, the timing generation section 109 generates a timing signal that indicates the start timing of FFT processing in the FFT section 112. The generated timing signal is output to the FFT section 112.

In the averaging section 110, averaging is performed on the received signal from the synchronization section 108 for a 2-symbol interval. The averaged received signal is output to selection section 111. In selection section 111, based on information indicating the number of transmission path estimation preamble symbols stored in the memory 114, either the received signal from the synchronization section 108 or the averaged received signal from the averaging section 110 is selected as the signal to be output to the FFT section 112.

Specifically, in the period in which a transmission path estimation preamble is received, when the number of transmission path estimation preamble symbols is 2, the averaged received signal from the averaging section 110 is selected as the signal to be output to the FFT section 112. The averaged received signal from the averaging section 110 at this time is equivalent to a signal in which a signal corresponding to a 1-symbol transmission path estimation preamble and a signal corresponding to another 1-symbol transmission path estimation preamble are averaged. In this averaged received signal, thermal noise is reduced by averaging. Conversely, when the number of transmission path estimation preamble symbols is 1, the received signal from the synchronization section 108 is selected as the signal to be output to the FFT section 112.

On the other hand, in the period in which an information signal (data) is received, the received signal from the synchronization section 108 (that is, the signal corresponding to an information signal in the received signal) is selected as the signal to be output to the FFT section 112, irrespective of the number of transmission path estimation preamble symbols. In this way the signal selected by selection section 111 is output to the FFT section 112.

In the FFT section 112, FFT processing is performed on the received signal from selection section 111 based on the timing signal generated by the timing generation section 109. This is equivalent to performing transmission path compensation for the received signal based on a known signal for transmission path estimation (transmission path estimation preamble). By this means, the signal transmitted by each subcarrier is extracted. The signals transmitted by each subcarrier are output to the demodulation section 113.

In the demodulation section 113, a demodulated signal is obtained by performing demodulation processing on the signals transmitted by each subcarrier from the FFT section 112. Specifically, the signals transmitted by each subcarrier are converted from a plurality of sequences of signals to a single-sequence signal. Then transmission path estimation is performed using a signal corresponding to a transmission path estimation preamble in the single-sequence received signal. Using the transmission path estimation result, a demodulated signal is obtained by performing transmission path compensation on the signal corresponding to an information signal in the single-sequence received signal.

When a 2-symbol transmission path estimation preamble is inserted in a burst unit signal by the communicating party, as described above a signal is output from selection section 111 to the FFT section 112 in which the signal corresponding to a transmission path estimation preamble in the received signal is averaged for a 2-symbol interval. By this means, thermal noise is reduced in the signal corresponding to a transmission path estimation preamble in the received signal, output from the FFT section 112 to the demodulation section 113. Therefore, the effects of thermal noise are also reduced in the demodulated signal obtained by the demodulation section 113. In this embodiment, the signal corresponding to a transmission path estimation preamble in a received signal prior to FFT processing is averaged for a 2-symbol interval, but a similar effect is also obtained if the signal corresponding to a transmission path estimation preamble in a received signal after FFT processing is averaged for a 2-symbol interval.

The demodulated signal obtained by the demodulation section 113 is output to the detection section 115. For the start of communication only, information indicating the number of transmission path estimation preamble symbols in the demodulated signal is output from the demodulation section 113 to the memory 114. This information is stored in the memory 114.

In the detection section 115, the quality of the demodulated signal from the demodulation section 113 is detected, and information indicating the detected quality (quality information) is generated. Eb/No, reception level information (RSSI), or the like can be used as a quality indicator. The generated quality information is output to above-mentioned selection section 102 in the transmitting system.

As stated above, in an OFDM communication apparatus according to this embodiment, it is necessary to notify a communicating party of the number of symbols of a transmission path estimation preamble selected based on channel quality via a broadcast channel, control channel, or the like. In order to notify a communicating party of this number of transmission path estimation preamble symbols, an information amount of only 1 bit is necessary for one user (one communicating party). However, when, for example, 16QAM is used as the modulation method and the number of subcarriers is 48, 192 bits of information can be transmitted by one symbol. Thus, the amount of information needed to notify a communicating party of the number of transmission path estimation preamble symbols can be said to be sufficiently small to be ignored when compared with the amount of information required for communication as a whole.

In this embodiment, a case where two kinds of transmission path estimation preamble, with a number of symbols of 1 and 2 respectively, are used as transmission path estimation preambles inserted in a burst unit signal has been described as an example, but the present invention can also be applied to a case where three or more kinds of transmission path estimation preamble, each with a different number of symbols, are used. In this case, the transmission path estimation preamble with the smallest number of symbols can be used when a factor other than thermal noise is the predominant factor in deterioration of error rate characteristics, and consequently an improvement in the demodulated signal error rate cannot be expected even if the number of transmission path estimation preambles is increased. Conversely, the transmission path estimation preamble with the largest number of symbols can be used on condition that the demodulated signal error rate does not meet a predetermined quality (for example, 0.01) when thermal noise is the predominant factor in deterioration of error rate characteristics. By this means, it is possible to achieve both an improvement in demodulated signal error rate characteristics and an improvement in information signal transmission efficiency.

In this embodiment, a case has been described where the threshold value used when selecting a plurality of transmission path estimation preambles is set using channel quality at the critical point at which demodulated signal error rate characteristics are either improved or not improved by increasing the number of transmission path estimation preambles inserted in a burst unit signal. The present invention is not limited to this, and can also be applied to cases where the threshold value used when selecting a plurality of transmission path estimation preambles is set by means of a variety of methods. For example, it is also possible to for the channel quality necessary to obtain a predetermined error rate (for example, 0.01) for a demodulated signal (in FIG. 2, Eb/No=22 dB) to be used as the above-mentioned threshold value. In this case, a transmission path estimation preamble with a smaller number of symbols can be used when the demodulated signal quality is greater than or equal to the threshold value, and, conversely, a transmission path estimation preamble with a larger number of symbols can be used when the demodulated signal quality is lower than the threshold value.

The effect of improving transmission efficiency in this embodiment will now be briefly described. When, for example, the packet length is 54 bytes and 16QAM-R=¾, the number of OFDM symbols necessary for information signal (data) transmission is 3, and therefore the number of OFDM symbols necessary for transmission of one packet of information is 4. In this embodiment, as stated above, when channel quality is of a certain level, the number of transmission path estimation preamble symbols inserted in a burst unit signal is changed from 2 to 1. If the number of users is 100, and 50 of the total number of users use a transmission path estimation preamble whose number of symbols is 1 as channel quality becomes good, the transmissible amount of information increases by 9600 bits (192×50). That is to say, the transmissible amount of information increases by 16.5%. If all 100 users use a transmission path estimation preamble whose number of symbols is 1, the transmissible amount of information will increase by 33%.

Thus, in this embodiment, the number of transmission path estimation preambles inserted in a burst unit signal is varied adaptively in accordance with channel quality. Specifically, when channel quality is of a certain level (that is, when a factor other than thermal noise is the predominant factor in deterioration of error rate characteristics, and consequently an improvement in the demodulated signal error rate cannot be expected even if the number of transmission path estimation preambles is increased), the number of transmission path estimation preambles inserted in a burst unit signal is made smaller. Conversely, when channel quality is not good (that is, when thermal noise is the predominant factor in deterioration of error rate characteristics), the number of transmission path estimation preambles inserted in a burst unit signal is increased. By this means, it is possible to achieve both an improvement in demodulated signal error rate characteristics and an improvement in information signal transmission efficiency.

In this embodiment, a case has been described where the quality of a demodulated signal obtained in the OFDM communication apparatus of the station in question (the station's own OFDM communication apparatus)—that is, the reception quality of a signal transmitted by a communicating party—is used as a channel quality indicator, but it goes without saying that it is also possible, with the present invention, for the quality of a demodulated signal obtained from reception quality at a communicating party—that is, the reception quality at a communicating party of a signal transmitted by the apparatus in question—to be used as a channel quality indicator (this applies not only to this embodiment, but also to the embodiments described hereinafter). In this case also, it is similarly possible to achieve both an improvement in demodulated signal error rate characteristics and an improvement in information signal transmission efficiency.

EMBODIMENT 2

In this embodiment, a case is described where, as an addition to Embodiment 1, not only reception level information but also multipath delay time (delay variance) is used as a channel quality indicator.

There is a possibility that demodulated signal error rate characteristics will vary not only in accordance with reception level information but also in accordance with the multipath delay time (that is, the difference in arrival times of the principal wave and a desired wave). Thus, it may not be optimal for the number of transmission path estimation preambles to be inserted in a burst unit signal to be determined by means of reception level information alone. That is to say, in general, there is greater deterioration of demodulated signal error rate characteristics when the multipath delay time is long, and conversely, there is less deterioration of demodulated signal error rate characteristics when the multipath delay time is short.

Thus, in this embodiment, when the multipath delay time is long, a larger threshold value than in Embodiment 1 is used as the threshold value used when switching between a transmission path estimation preamble whose number of symbols is 1 and a transmission path estimation preamble whose number of symbols is 2. That is to say, taking FIG. 2 as an example, whereas the threshold value used in Embodiment 1 is $Eb/No=30$ dB, the threshold value used in this embodiment is $Eb/No.$ 30 dB (for example, 32 dB). When the multipath delay time is short, a smaller threshold value than in Embodiment 1 may be used when switching between a transmission path estimation preamble whose number of symbols is 1 and a transmission path estimation preamble whose number of symbols is 2.

Figure 7:
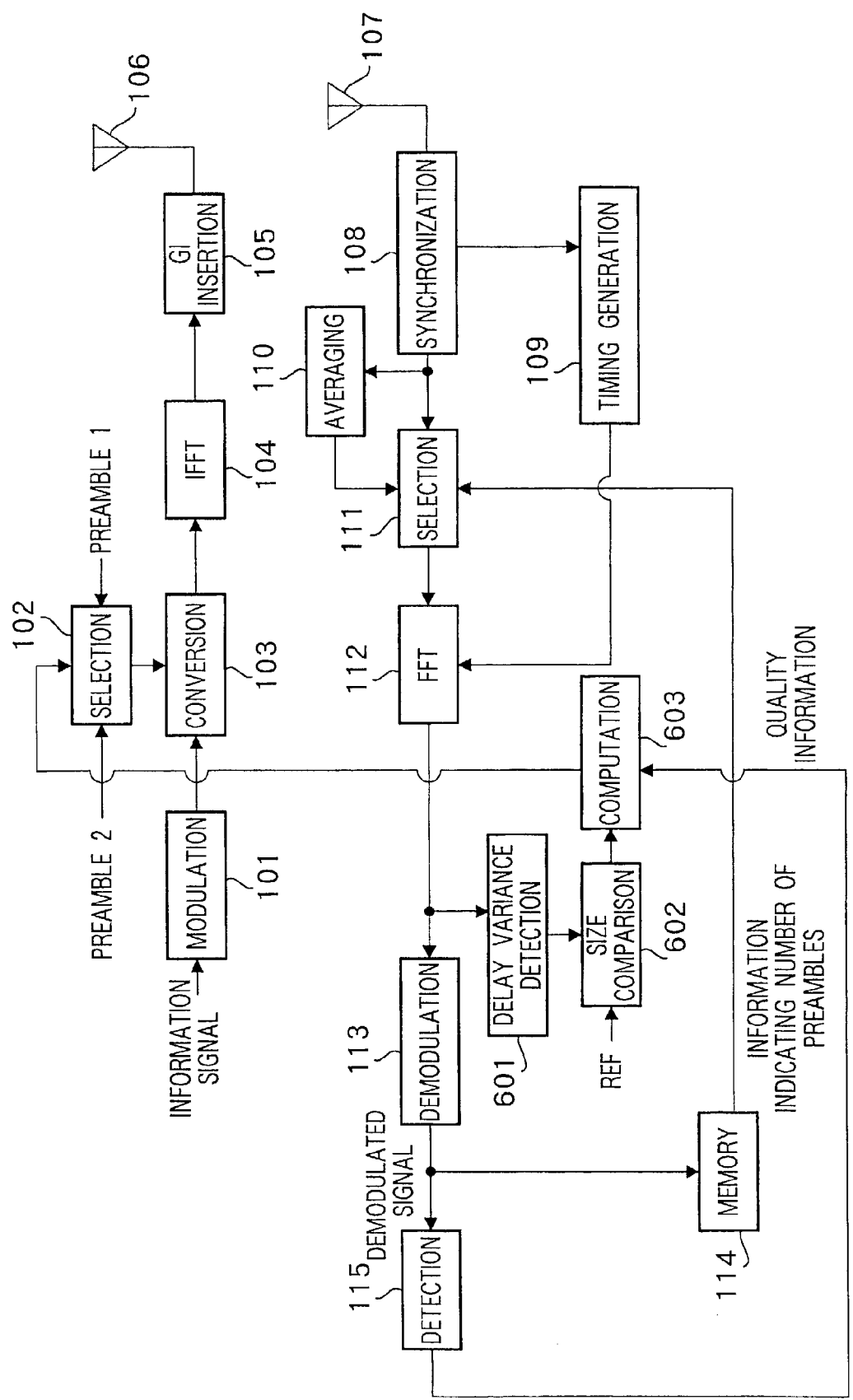
FIG. 7 is a block diagram showing the configuration of an OFDM communication apparatus according to Embodiment 2 of the present invention.

FIG. 7 is a block diagram showing the configuration of an OFDM communication apparatus according to Embodiment 2 of the present invention. Parts in FIG. 7 identical to those in Embodiment 1 (FIG. 3) are assigned the same codes as in FIG. 3 and their detailed explanations are omitted.

As shown in FIG. 7, an OFDM communication apparatus according to this embodiment has a configuration comprising, in addition to the configuration of an OFDM communication apparatus according to Embodiment 1, a delay variance detection section 601 that detects delay variance (multipath delay time) using signals transmitted by each subcarrier, a size comparison section 602 that compares a detected delay variance with a threshold value REF, and a computation section 603 that performs computation based on a comparison result on quality information obtained from a detection section 115, and outputs post-computation quality information to a selection section 102.

Figure 8:
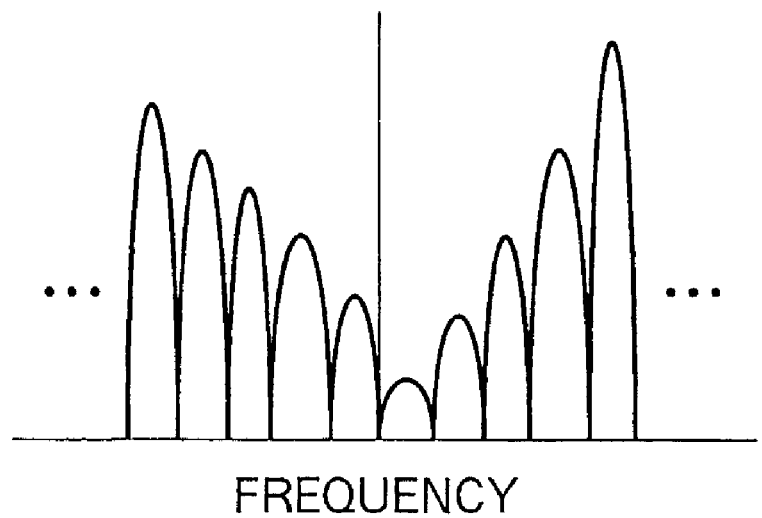
FIG. 8 is a schematic diagram illustrating reception levels of signals transmitted by each subcarrier in an OFDM communication apparatus according to Embodiment 2 of the present invention (first example)
Figure 9:
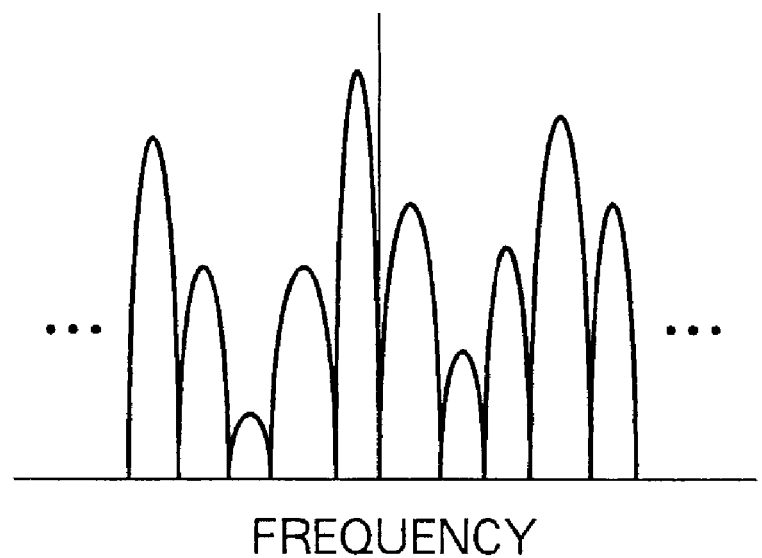
FIG. 9 is a schematic diagram illustrating reception levels of signals transmitted by each subcarrier in an OFDM communication apparatus according to Embodiment 2 of the present invention (second example)

Next, the operation of an OFDM communication apparatus that has the above configuration will be described with additional reference to FIG. 8 through FIG. 10, considering only points of difference from Embodiment 1. FIG. 8 is a schematic diagram illustrating reception levels of signals transmitted by each subcarrier in an OFDM communication apparatus according to Embodiment 2 of the present invention (first example), FIG. 9 is a schematic diagram illustrating reception levels of signals transmitted by each subcarrier in an OFDM communication apparatus according to Embodiment 2 of the present invention (second example), and FIG. 10 is a block diagram showing the configuration of the delay variance detection section 601 in an OFDM communication apparatus according to Embodiment 2 of the present invention.

In the delay variance detection section 601, delay variance is detected using signals transmitted by each subcarrier from an FFT section 112. Specifically, delay variance—that is, multipath delay time—is detected using the difference in reception level between signals transmitted by each subcarrier. That is to say, when the multipath delay time is short, the difference in reception level between signals transmitted by adjacent subcarriers is small, as shown in FIG. 8, and conversely, when the multipath delay time is long, the difference in reception level between signals transmitted by adjacent subcarriers is large, as shown in FIG. 9.

Figure 10:
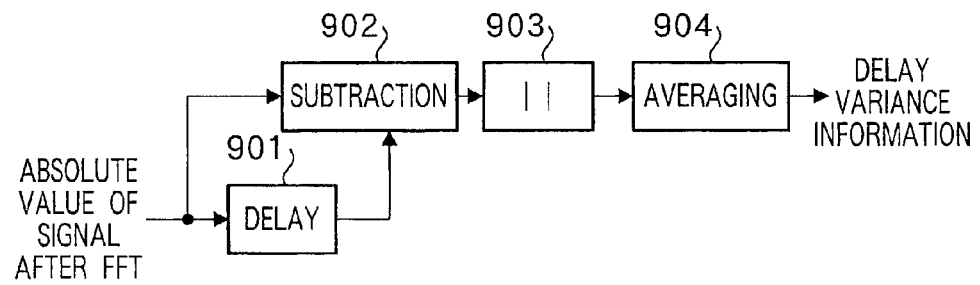
FIG. 10 is a block diagram showing the configuration of the delay variance detection section in an OFDM communication apparatus according to Embodiment 2 of the present invention.

First, therefore, as shown in FIG. 10, the absolute values of signals transmitted by each subcarrier are output sequentially to a subtraction section 902, and are also output to the subtraction section 902 after being delayed by a predetermined time by a delay section 901.

In the subtraction section 902, the difference in reception level between signals (absolute values) transmitted by adjacent subcarriers is calculated. Calculated reception level differences are processed by an absolute value calculation section 903 to find their absolute values, and then averaged by an averaging section 904. By this means the delay variance is detected. Information indicating the detected delay variance is output to the size comparison section 602. In the size comparison section 602, the delay variance detected by the delay variance detection section 601 is compared with a threshold value. The result of the comparison is output to the computation section 603.

In the computation section 603, computation is performed on quality information from the detection section 115 based on the result of the comparison by the size comparison section 602. Specifically, when the delay variance is greater than or equal to the threshold value (that is, when the multipath delay time is long), a predetermined value is subtracted from the quality information. Performing subtraction on the quality information in this way is effectively equivalent to increasing the threshold value in selection section 102 (that is, using a larger threshold value than in Embodiment 1 as the threshold value used when switching between a transmission path estimation preamble whose number of symbols is 1 and a transmission path estimation preamble whose number of symbols is 2). Conversely, when the delay variance is less than the threshold value (that is, when the multipath delay time is short), no computation is performed on the quality information. Quality information that has been subjected to computation by the computation section 603 is output to selection section 102 in the transmitting system.

Thus, according to this embodiment, by using not only reception level information but also multipath delay time (delay variance) as a channel quality indicator, it is possible to achieve both an improvement in demodulated signal error rate characteristics and an improvement in information signal transmission efficiency irrespective of multipath delay time.

EMBODIMENT 3

In this embodiment, a case is described where error in the multipath delay time calculated in Embodiment 2 is reduced.

In general, in a receiving system, error may occur in a reception level due to error in automatic gain control in the radio section, or the like. In this case, error occurs in the delay variance detected by the delay variance detection section 601 shown in FIG. 7. Thus, in this embodiment, the calculated delay variance is divided by the average of the reception levels of the signals transmitted by each subcarrier.

Figure 11:
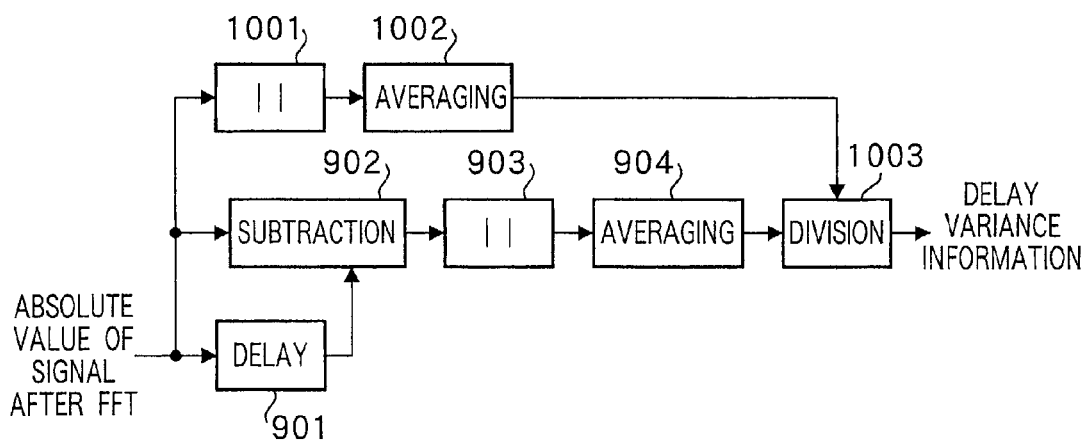
FIG. 11 is a block diagram showing the configuration of the delay variance detection section in an OFDM communication apparatus according to Embodiment 3 of the present invention.

The configuration of an OFDM communication apparatus according to this embodiment is the same as that in Embodiment 2 except for the delay variance detection section 601. Therefore, only the internal configuration of the delay variance detection section 601 will be described, with reference to FIG. 11. FIG. 11 is a block diagram showing the internal configuration of the delay variance detection section 601 in an OFDM communication apparatus according to Embodiment 3 of the present invention. Parts in FIG. 11 identical to those in Embodiment 2 (FIG. 10) are assigned the same codes as in FIG. 10 and their detailed explanations are omitted.

In FIG. 11, absolute values are found (that is, reception levels are calculated) for signals transmitted by each subcarrier in an absolute value calculation section 1001, and these are then averaged by an averaging section 1002. By this means, the average value of reception levels of signals transmitted by each subcarrier is calculated. In a division section 1003, the delay variance calculated by averaging section 904 is divided by the reception level average value from averaging section 1002. The new delay variance obtained in this way is output to the size comparison section 602 in FIG. 7.

Thus, in this embodiment, the calculated delay variance is divided by the received signal level (the average value of reception levels of signals transmitted by each subcarrier), and the value obtained by this division is used as a new delay variance. By this means, it is possible to calculate a highly accurate multipath delay time even when error occurs in reception levels. It is therefore possible to achieve both an improvement in demodulated signal error rate characteristics and an improvement in information signal transmission efficiency irrespective of error in reception levels.

EMBODIMENT 4

In this embodiment, a case is described where, in Embodiments 1 through 3, the number of transmission path estimation preamble symbols to be inserted in a burst unit signal is selected in accordance with the total number of communicating parties (users) actually performing communication.

In an actual environment, not all users are necessarily performing communication (or communication is not necessarily being performed with all users), and therefore there are time slots in which communication is not performed in a unit frame. A "unit frame" here contains only the predetermined number of burst unit signals shown in FIG. 5 or FIG. 6. To be specific, when, for example, there are many communicating parties performing communication, a unit frame contains a larger number of burst unit signals and fewer time slots that are not used for communication. Conversely, when there are few communicating parties performing communication, a unit frame contains a smaller number of burst unit signals and more time slots that are not used for communication.

Therefore, when there are few communicating parties actually performing communication, overall transmission efficiency will fall if a transmission path estimation preamble with a large number of symbols is inserted in a burst unit signal for predetermined communicating parties. On the other hand, when there are many communicating parties actually performing communication, overall transmission efficiency will scarcely fall even if a transmission path estimation preamble with a large number of symbols is inserted in a burst unit signal for predetermined communicating parties.

Thus, in this embodiment, the number of transmission path estimation preamble symbols to be inserted in a burst unit signal is selected in accordance with the total number of communicating parties (users) actually performing communication. That is to say, when the total number of communicating parties actually performing communication is large, a smaller threshold value than in Embodiment 1 is used as the threshold value used when switching between a transmission path estimation preamble whose number of symbols is 1 and a transmission path estimation preamble whose number of symbols is 2. And when the total number of communicating parties actually performing communication is small, a larger threshold value than in Embodiment 1 may be used as the threshold value used when switching between a transmission path estimation preamble whose number of symbols is 1 and a transmission path estimation preamble whose number of symbols is 2.

Figure 12:
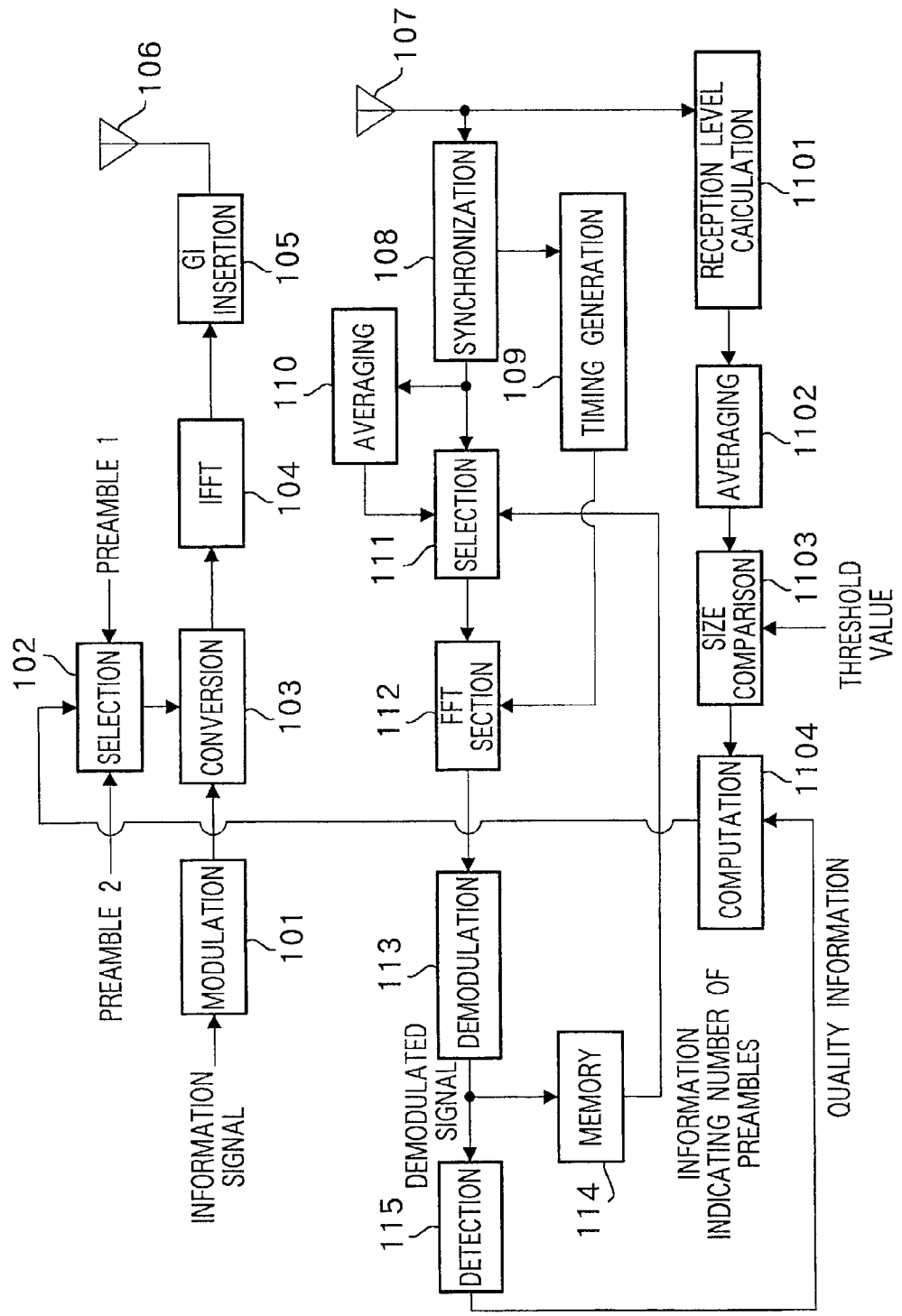
FIG. 12 is a block diagram showing the configuration of an OFDM communication apparatus according to Embodiment 4 of the present invention.

Although this kind of selection can also be applied to any of Embodiments 1 through 3, in this embodiment the case where this kind of selection is applied to Embodiment 1 will be taken as an example, and will be described with reference to FIG. 12. FIG. 12 is a block diagram showing the configuration of an OFDM communication apparatus according to Embodiment 4 of the present invention. Parts in FIG. 12 identical to those in Embodiment 1 (FIG. 3) are assigned the same codes as in FIG. 3 and their detailed explanations are omitted.

An OFDM communication apparatus according to this embodiment has a configuration comprising, in addition to the configuration of an OFDM communication apparatus according to Embodiment 1, a reception level calculation section 1101 that calculates the reception level of a received signal from an antenna 107, an averaging section 1102 that performs averaging of calculated reception levels and calculates the reception level for a unit frame, a size comparison section 1103 that compares a calculated unit frame reception level with a threshold value, and a computation section 1104 that performs computation based on a comparison result on quality information from a detection section 115, and outputs the quality information subjected to computation to a selection section 102.

Next, the operation of an OFDM communication apparatus that has the above configuration will be described, considering only points of difference from Embodiment 1. In the reception level calculation section 1101, the reception level of a received signal from antenna 107 is calculated for each frame. Calculated received signal reception levels for each frame are averaged by the averaging section 1102, and the reception level is calculated for a unit frame. The reception level for a unit frame is output to the size comparison section 1103. In the size comparison section 1103, the unit frame reception level is compared with a threshold value. The result of the comparison is output to the computation section 1104.

In the computation section 1104, computation is performed on quality information from the detection section 115 based on the result of the comparison by the size comparison section 1103. Specifically, when the unit frame reception level is greater than or equal to the threshold value (that is, when the total number of communicating parties actually performing communication is large), a predetermined value is added to the quality information. Performing addition to the quality information in this way is effectively equivalent to decreasing the threshold value in selection section 102 (that is, using a smaller threshold value than in Embodiment 1 as the threshold value used when switching between a transmission path estimation preamble whose number of symbols is 1 and a transmission path estimation preamble whose number of symbols is 2). Conversely, when the unit frame reception level is less than the threshold value (that is, when the total number of communicating parties actually performing communication is small), no computation is performed on the quality information. Quality information that has been subjected to computation by the computation section 1104 is output to selection section 102 in the transmitting system.

Thus, according to this embodiment, the number of transmission path estimation preamble symbols to be inserted in a burst unit signal is selected in accordance with the total number of communicating parties (users) actually performing communication. In this way, by increasing the number of transmission path estimation preamble symbols inserted in a burst unit signal for predetermined communicating parties when the total number of communicating parties actually performing communication is small, it is possible to reduce time slots not used for communication in each frame, and also to improve demodulated signal error rate characteristics at the above-mentioned predetermined communicating parties. Conversely, by decreasing the number of transmission path estimation preamble symbols inserted in a burst unit signal for predetermined communicating parties when the total number of communicating parties actually performing communication is large, it is possible to increase the total number of burst unit signals contained in each frame, and so improve transmission efficiency. Therefore, according to this embodiment, it is possible to achieve both an improvement in demodulated signal error rate characteristics and an improvement in information signal transmission efficiency.

EMBODIMENT 5

In this embodiment, a case is described where the number of transmission path estimation preamble symbols inserted in a burst unit signal is varied in accordance with the communication channel.

In OFDM communication, there are specific channels for which communication quality better than that of an ordinary channel is required. Such a specific channel may be, for example, a control channel (a channel used to send information indicating a burst to be received, information indicating the modulation method applied to an information signal, or the like), or a retransmission channel (a channel used to send information for requesting retransmission).

The number of such specific channels is small compared with the total number of channels. Therefore, overall transmission efficiency scarcely falls even if the number of transmission path estimation preamble symbols inserted in a burst unit signal in a specific channel is increased (in this embodiment, to two symbols) on a fixed basis. By this means, it is possible to improve the demodulated signal error rate in a specific channel for which better communication quality is required with almost no effect on overall transmission efficiency.

Figure 13:
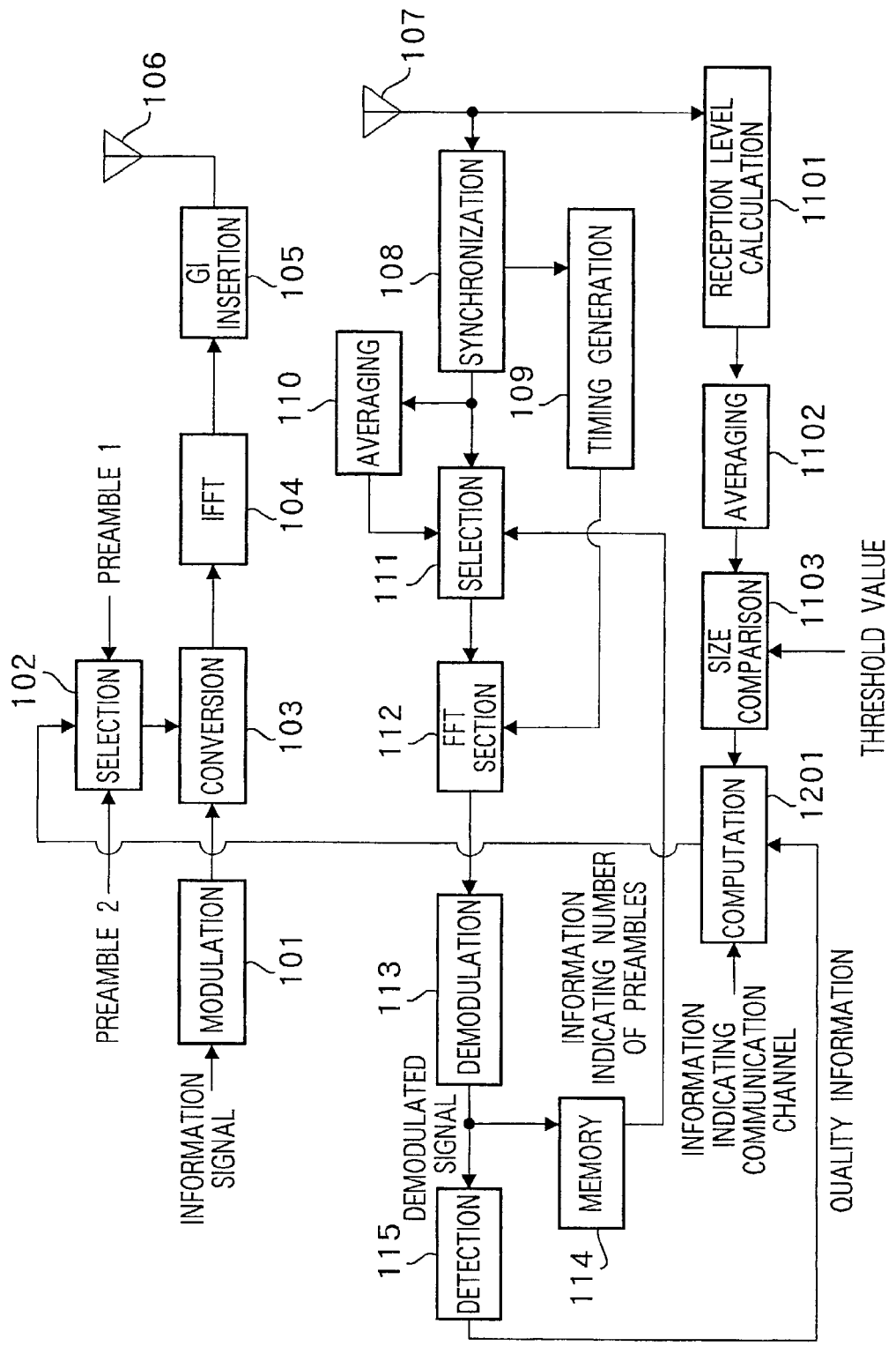
FIG. 13 is a block diagram showing the configuration of an OFDM communication apparatus according to Embodiment 5 of the present invention.

Increasing the number of transmission path estimation preamble symbols inserted in a burst unit signal for such a specific channel on a fixed basis will be described with reference to FIG. 13, taking the case where this procedure is applied to Embodiment 4 as an example (it goes without saying that this procedure can be applied to any of Embodiments 1 through 3). FIG. 13 is a block diagram showing the configuration of an OFDM communication apparatus according to Embodiment 5 of the present invention. Parts in FIG. 13 identical to those in Embodiment 4 (FIG. 12) are assigned the same codes as in FIG. 12 and their detailed explanations are omitted.

An OFDM communication apparatus according to this embodiment has a configuration wherein computation section 1104 in an OFDM communication apparatus according to Embodiment 4 is replaced by a computation section 1201 that performs computation on a demodulated signal from a detection section 115 based on a comparison result from a size comparison section 1103 and information indicating the communication channel.

Next, the operation of an OFDM communication apparatus that has the above configuration will be described, considering only points of difference from Embodiment 4. In the computation section 1201, computation is performed on quality information from the detection section 115 based on the result of a comparison by the size comparison section 1103 and information indicating the communication channel. Specifically, as in Embodiment 4, when the unit frame reception level is greater than or equal to a threshold value (that is, when the total number of communicating parties actually performing communication is large), a predetermined value is added to the quality information.

Moreover, only when it is recognized from information indicating the communication channel that the communication channel is a specific channel, a fairly large predetermined value is subtracted from the quality information. Subtracting a fairly large value from the quality information in this way is effectively equivalent to making a fairly large increase in the threshold value in a selection section 102. By this means the number of transmission path estimation preamble symbols inserted in a burst unit signal can be made two symbols on a fixed basis. Quality information that has been subjected to computation by the computation section 1201 in this way is output to selection section 102 in the transmitting system.

With an MAC (Media Access Control) section, for example, the timing at which a signal transmitted via a specific channel is received by this OFDM communication apparatus is known. Thus, it is possible to use information generated by an MAC section as information indicating the communication channel that is input to the computation section 1201.

Thus, according to this embodiment, the number of transmission path estimation preamble symbols inserted in a burst unit signal for a communicating party is varied in accordance with the communication channel used to transmit that burst unit signal. That is to say, when, for example, a communication channel is a specific channel, the number of transmission path estimation preamble symbols inserted in a burst unit signal is increased on a fixed basis, and therefore it is possible to improve demodulated signal error rate characteristics in a specific channel for which better communication quality is required. Conversely, when a communication channel is an ordinary channel, the number of transmission path estimation preamble symbols inserted in a burst unit signal is varied as described in Embodiment 1 through Embodiment 4. By this means, it is possible to improve the demodulated signal error rate in a specific channel for which better communication quality is required with almost no effect on overall transmission efficiency.

In the above-described embodiment a control channel and a retransmission channel have been quoted as examples of a specific channel for which a large number of preambles are used, but a specific channel of the present invention is not limited to these, and may include a broadcast channel or the like, for example, the key point being the broad inclusion of channels for which communication quality better than that of an ordinary channel (such as a user channel, for example) is required, as described above.

EMBODIMENT 6

In this embodiment, a case is described where the number of transmission path estimation preamble symbols selected by a communicating party is not recognized by means of notification from that communicating party, but is estimated by means of a correlation value calculated using a signal transmitted by that communicating party.

In Embodiment 1 through Embodiment 5, the number of transmission path estimation preamble symbols selected by a communicating party is recognized by means of information indicating the number of transmission path estimation preamble symbols from that communicating party. In the above embodiments, two kinds of transmission path estimation preamble (that is, transmission path estimation preambles whose number of symbols is 1 and 2 respectively) are used, and therefore the amount of information that needs to be provided for transmission of the above-mentioned information is only 1 bit for one communicating party. Thus, considering the improvement in transmission efficiency achieved by the present invention, this amount of information is very small.

However, in order to achieve a further improvement in transmission efficiency, it is necessary to be able to recognize the number of transmission path estimation preamble symbols selected by a communicating party without using this kind of information. If this kind of information can be rendered unnecessary, with a total of 200 communicating parties, for example, the amount of information can be reduced by 200 bits.

Thus, in this embodiment, the number of transmission path estimation preamble symbols selected by a communicating party is estimated by means of a correlation value calculated using a burst unit signal transmitted by that communicating party and an IFFT-processed transmission path estimation preamble.

Figure 14:
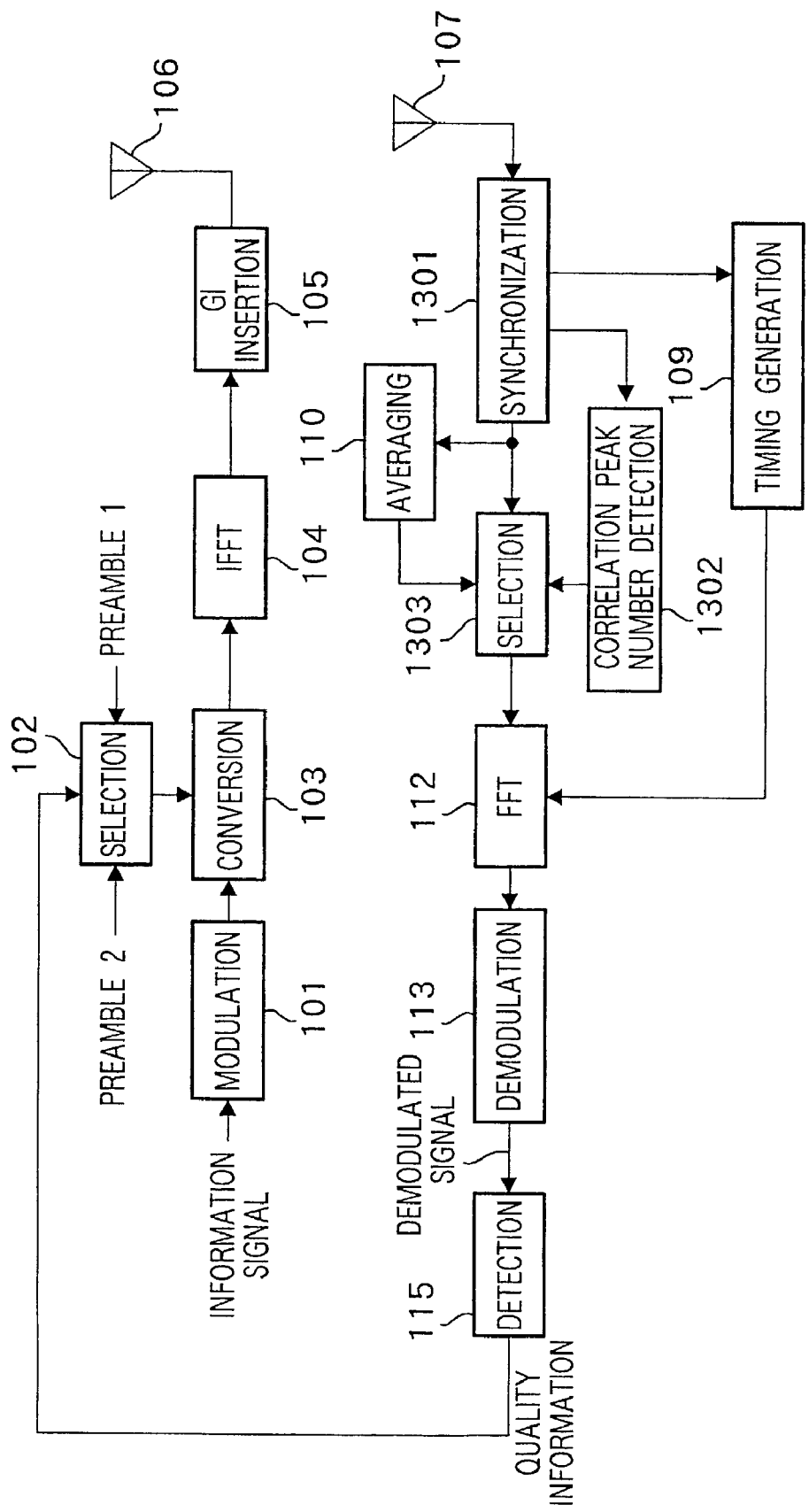
FIG. 14 is a block diagram showing the configuration of an OFDM communication apparatus according to Embodiment 6 of the present invention.

FIG. 14 is a block diagram showing the configuration of an OFDM communication apparatus according to Embodiment 6 of the present invention. Parts in FIG. 14 identical to those in Embodiment 1 (FIG. 3) are assigned the same codes as in FIG. 3 and their detailed explanations are omitted.

An OFDM communication apparatus according to this embodiment has a configuration wherein, in an OFDM communication apparatus according to Embodiment 1, the memory 114 is eliminated, a synchronization section 1301 is used instead of synchronization section 108, a selection section 1303 is used instead of selection section 111, and a correlation peak number detection section 1302 is additionally provided.

The synchronization section 1301 has the same kind of configuration as synchronization section 108 in Embodiment 1, except that it outputs a calculated correlation value to the correlation peak number detection section 1302. The correlation peak number detection section 1302 detects the number of peaks in correlation values calculated by the synchronization section 1301, and outputs the detection result to selection section 1303. Selection section 1303 has the same kind of configuration as selection section 111 in Embodiment 1, except that it outputs either a received signal from the synchronization section 1301 or an averaged received signal from the averaging section 110 based on the result of detection by the correlation peak number detection section 1302.

Figure 15:
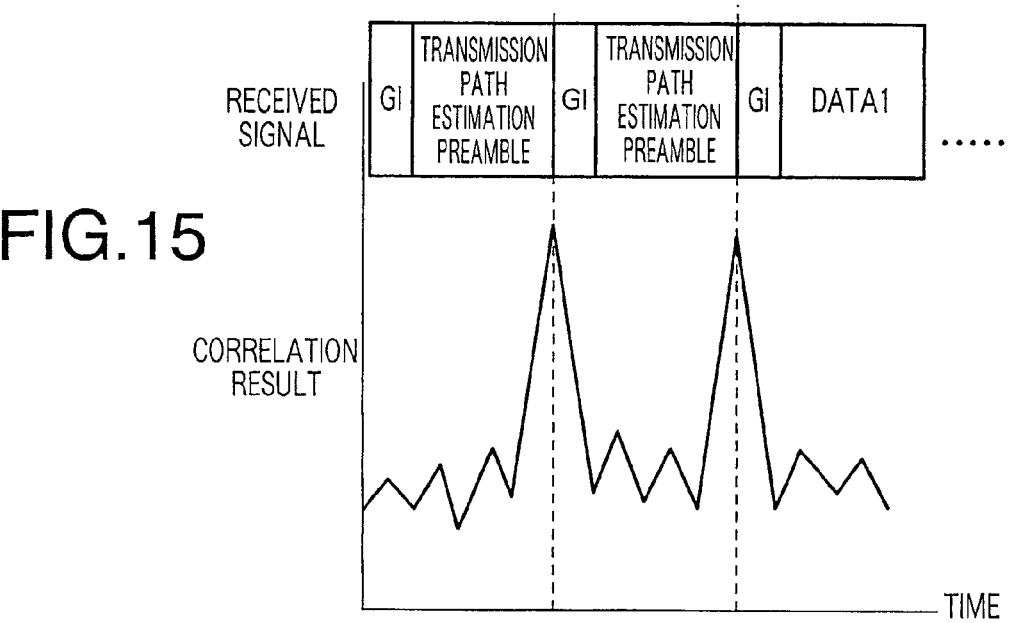
FIG. 15 is a schematic diagram illustrating correlation values calculated by the synchronization section of an OFDM communication apparatus according to Embodiment 6 of the present invention (first example)
Figure 16:
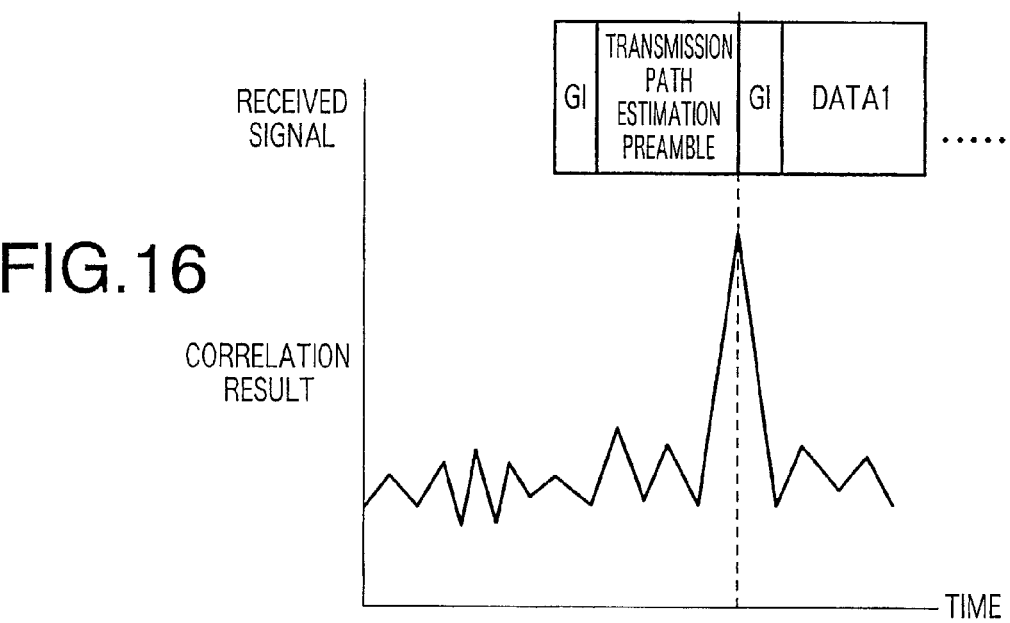
FIG. 16 is a schematic diagram illustrating correlation values calculated by the synchronization section of an OFDM communication apparatus according to Embodiment 6 of the present invention (second example)

Next, the operation of an OFDM communication apparatus that has the above configuration will be described with additional reference to FIG. 15 through FIG. 17. FIG. 15 is a schematic diagram illustrating correlation values calculated by the synchronization section 1301 of an OFDM communication apparatus according to Embodiment 6 of the present invention (first example), FIG. 16 is a schematic diagram illustrating correlation values calculated by the synchronization section 1301 of an OFDM communication apparatus according to Embodiment 6 of the present invention (second example), and FIG. 17 is a block diagram showing the configuration of the correlation peak number detection section 1302 in an OFDM communication apparatus according to Embodiment 6 of the present invention.

In the transmitting system in this embodiment, unlike Embodiment 1, information indicating the number of transmission path estimation preamble symbols selected by selection section 102 is not sent to a communicating party either at the start of communication or at predetermined time intervals.

Meanwhile, in the receiving system, the number of transmission path estimation preamble symbols selected by a communicating party can be calculated using a received signal relating to that communicating party and an IFFT-processed transmission path estimation preamble. Specifically, when the number of transmission path estimation preamble symbols selected by a communicating party is 2 (1), a signal corresponding to a transmission path estimation preamble equivalent to two symbols (one symbol) is contained in the received signal, and therefore two peaks are (one peak is) generated in the calculated correlation values.

Figure 17:
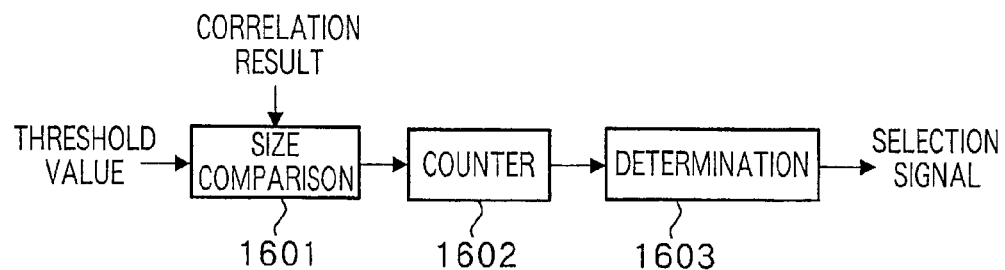
FIG. 17 is a block diagram showing the configuration of the correlation peak number detection section in an OFDM communication apparatus according to Embodiment 6of the present invention.

Thus, in the correlation peak number detection section 1302, a correlation value calculated by the synchronization section 1301 is compared with a threshold value by a size comparison section 1601, as shown in FIG. 17. The result of the comparison is output to a counter 1602. In the counter 1602, the number of times the correlation value is greater than or equal to the threshold value is counted, based on the comparison results. The result of the count is output to a determination section 1603. In the determination section 1603, the result of the count is determined, and the number of peaks in the correlation values is detected. The detection result is output to selection section 1303. The number of transmission path estimation preamble symbols is detected by selection section 1303 in accordance with this detection result. That is to say, when the number of peaks in the correlation values is 1, the number of transmission path estimation preamble symbols is recognized as being 1, and when the number of peaks in the correlation values is 2, the number of transmission path estimation preamble symbols is recognized as being 2. Subsequent operation by selection section 1303 is the same as in Embodiment 1, and a detailed description is omitted here.

Thus, in this embodiment, the number of transmission path estimation preamble symbols selected by a communicating party is not recognized by means of notification from that communicating party, but is estimated by means of a correlation value calculated using a signal transmitted by that communicating party. By this means, transmission of information indicating the number of transmission path estimation preamble symbols is rendered unnecessary, thereby making it possible to further prevent a fall in transmission efficiency.

EMBODIMENT 7

In this embodiment, a case is described where erroneous estimation of the number of transmission path estimation preamble symbols is prevented.

In Embodiment 6, the number of transmission path estimation preamble symbols selected by a communicating party is estimated by means of a correlation value calculated using a signal transmitted by that communicating party. However, when channel quality is poor, it may not be possible to estimate the number of transmission path estimation preamble symbols accurately due to the occurrence of error in the calculated correlation value. As a result, there is a risk of deterioration of demodulated signal error rate characteristics.

Thus, in this embodiment, when channel quality is poor the number of transmission path estimation preamble symbols inserted in a burst unit signal is increased (here, to two symbols) on a fixed basis. By this means, it is possible to prevent erroneous estimation of the number of transmission path estimation preamble symbols. Inserting a transmission path estimation preamble with a large number of symbols in a signal for a communicating party for which communication quality is poor in this way will be described below taking a case where this procedure is applied to Embodiment 1 as an example (it goes without saying that this procedure can also be applied to Embodiment 2 through Embodiment 6).

Figure 18:
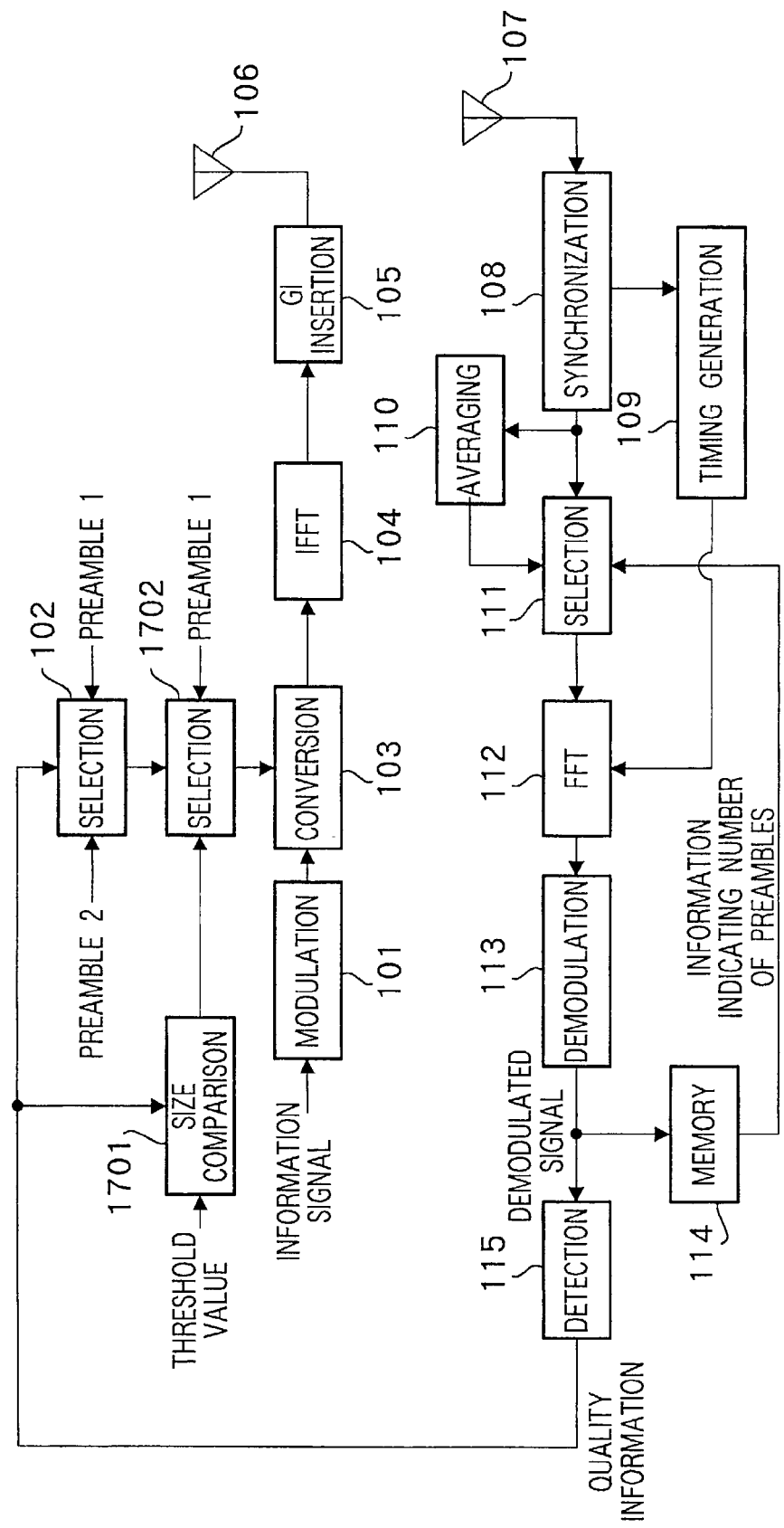
FIG. 18 is a block diagram showing the configuration of an OFDM communication apparatus according to Embodiment 7 of the present invention.

FIG. 18 is a block diagram showing the configuration of an OFDM communication apparatus according to Embodiment 7 of the present invention. Parts in FIG. 18 identical to those in Embodiment 1 (FIG. 3) are assigned the same codes as in FIG. 3 and their detailed explanations are omitted.

An OFDM communication apparatus according to this embodiment has a configuration wherein an OFDM communication apparatus according to Embodiment 1 is provided with a size comparison section 1701 that compares quality information from a detection section 115 with a threshold value and outputs the result of the comparison to a selection section 1702, which outputs either a transmission path estimation preamble from selection section 102 or a transmission path estimation preamble whose number of symbols is 2 to the conversion section 103 based on the result of a comparison by the size comparison section 1701.

Next, the operation of an OFDM communication apparatus that has the above configuration will be described, considering only points of difference from Embodiment 1. Quality information generated by the detection section 115 is output to the size comparison section 1701 and selection section 102. The same kind of operation is performed as in Embodiment 1, and a transmission path estimation preamble is output from selection section 102 to selection section 1702.

In the size comparison section 1701, quality information is compared with a threshold value. The result of this comparison is output to selection section 1702. In selection section 1702, either the transmission path estimation preamble from selection section 102 or a transmission path estimation preamble whose number of symbols is 2 is selected as the transmission path estimation preamble to be output to the conversion section 103. Specifically, a transmission path estimation preamble whose number of symbols is 2 is selected only when channel quality is identified as being poor according to the result of the comparison by the size comparison section 1701. In other cases (that is, when channel quality is identified as being good), the transmission path estimation preamble from selection section 102 is selected as the transmission path estimation preamble to be output to the conversion section 103. The transmission path estimation preamble selected by selection section 1702 is output to the conversion section 103.

In this embodiment, in the same way as in Embodiment 1, information indicating the number of transmission path estimation preamble symbols selected by selection section 1702 is transmitted to a communicating party via a specific channel at the start of communication and at predetermined time intervals. Information indicating the transmission path estimation preamble transmitted in this way is stored in the memory 114 of the transmitting system at the communicating party.

Thus, in this embodiment, the number of transmission path estimation preamble symbols inserted in a burst unit signal is increased on a fixed basis for a communicating party for which communication quality is poor. By this means, the number of transmission path estimation preambles contained in a received signal can be recognized reliably by the communicating party, enabling deterioration of demodulated signal error rate characteristics to be prevented. As increasing the number of transmission path estimation preamble symbols on a fixed basis is limited to a burst unit signal for a communicating party for which communication quality is poor, the fall in overall transmission efficiency is very small.

EMBODIMENT 8

In this embodiment, a case is described where the number of transmission path estimation preamble symbols selected by a communicating party is not recognized by means of notification from that communicating party, but is estimated using a signal transmitted by that communicating party, while the circuit scale is reduced.

In Embodiment 6, the number of transmission path estimation preamble symbols selected by a communicating party is estimated by means of a correlation value calculated using a signal transmitted by that communicating party. However, when the number of FFT samples is 64, for example, 64 complex correlators are necessary in order to configure a correlator that calculates correlation values. Consequently, the circuit scale of an OFDM communication apparatus provided with this kind of correlator is very large.

Thus, in this embodiment, when the reception level of a received signal for a communicating party is greater than or equal to a threshold value, it is estimated that a transmission path estimation preamble with a smaller number of symbols has been inserted in a received signal for that communicating party. This estimation is made in consideration of the fact that the communicating party has selected a transmission path estimation preamble with a smaller number of symbols due to the fact that channel quality is good for the communicating party.

Conversely, when the reception level of a received signal for a communicating party is less than a threshold value, it is estimated that a transmission path estimation preamble with a larger number of symbols has been inserted in a received signal for that communicating party. This estimation is made in consideration of the fact that the communicating party has selected a transmission path estimation preamble with a larger number of symbols due to the fact that channel quality is poor for the communicating party.

Figure 19:
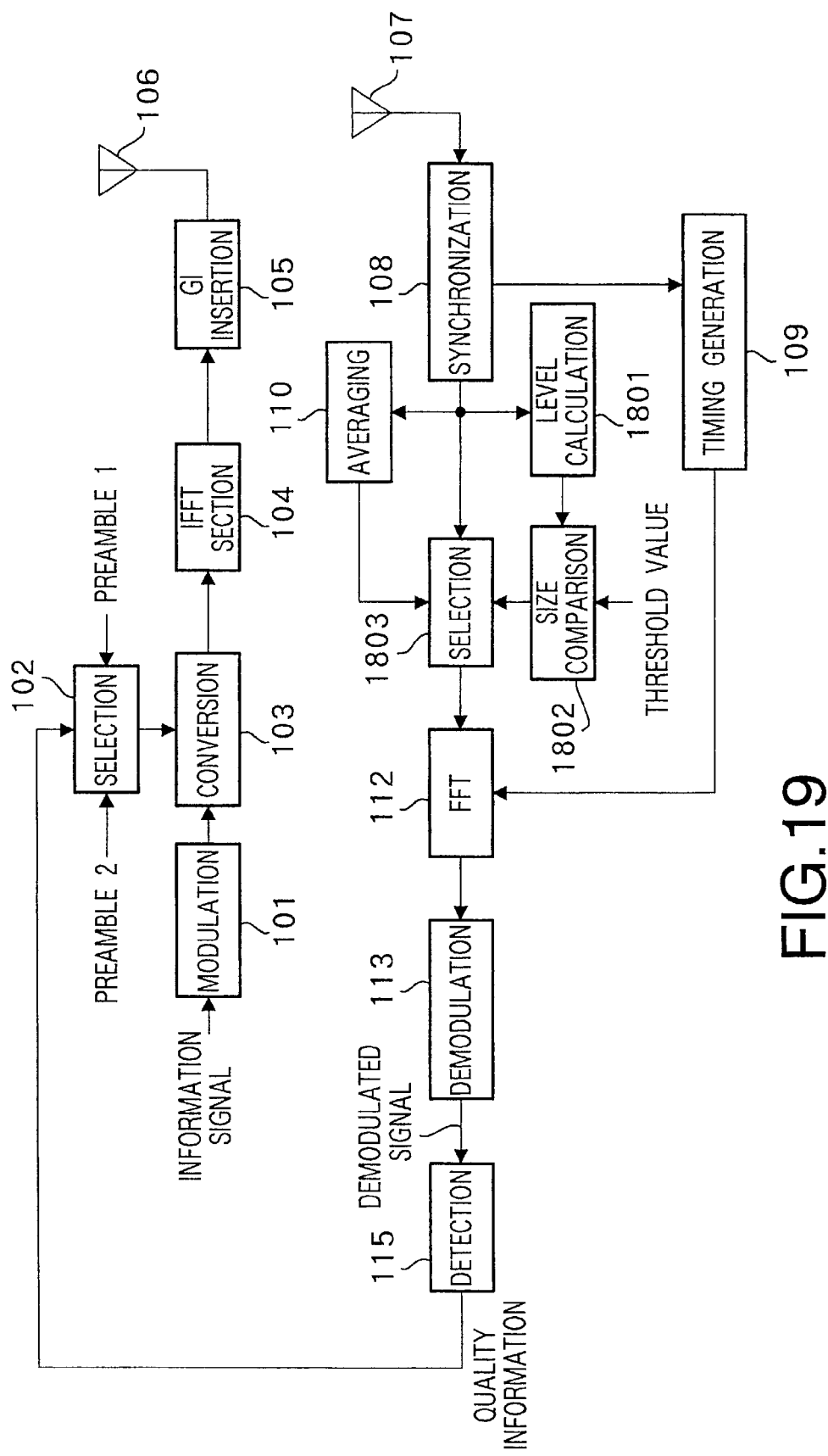
FIG. 19 is a block diagram showing the configuration of an OFDM communication apparatus according to Embodiment 8 of the present invention.

FIG. 19 is a block diagram showing the configuration of an OFDM communication apparatus according to Embodiment 8 of the present invention. Parts in FIG. 19 identical to those in Embodiment 1 (FIG. 3) are assigned the same codes as in FIG. 3 and their detailed explanations are omitted.

An OFDM communication apparatus according to this embodiment has a configuration wherein, in an OFDM communication apparatus according to Embodiment 1, the memory 114 is eliminated, a selection section 1803 is used instead of selection section 111, and a level calculation section 1801 and size comparison section 1802 are additionally provided.

Selection section 1803 has the same kind of configuration as selection section 111 in Embodiment 1, except that it outputs either a received signal from a synchronization section 108 or an averaged received signal from an averaging section 110 based on the result of a comparison by the size comparison section 1802. The level calculation section 1801 calculates the reception level of a received signal from the synchronization section 108, and outputs the calculated reception level to the size comparison section 1802. The size comparison section 1802 compares the calculated reception level with a threshold value, and outputs the result of the comparison to selection section 1803.

Next, the operation of an OFDM communication apparatus that has the above configuration will be described, considering only points of difference from Embodiment 1. In the transmitting system in this embodiment, unlike Embodiment 1, information indicating the number of transmission path estimation preamble symbols selected by selection section 102 is not sent to a communicating party either at the start of communication or at predetermined time intervals.

Meanwhile, in the receiving system, the reception level of a received signal from the synchronization section 108 is calculated by the level calculation section 1801. The calculated reception level is stored in this level calculation section 1801 and is also output to the size comparison section 1802. This level calculation section 1801 can comprise a single memory that stores the calculated reception level ($I^2+Q^2$). Alternatively, this level calculation section 1801 can comprise two multipliers (that is, a multiplier that multiplies the received signal I component by itself, and a multiplier that multiplies the received signal Q component by itself) and one adder (that is, an adder that adds together the results from the two multipliers).

In the size comparison section 1802, the calculated reception level is compared with a threshold value. The result of the comparison is output to selection section 1803. In selection section 1803, the number of transmission path estimation preamble symbols is detected based on the result of the comparison by the size comparison section 1802. Specifically, when the received signal reception level is higher than or equal to the threshold value, it is detected that a transmission path estimation preamble with a smaller number of symbols (here, one) has been inserted in the received signal. Conversely, when the received signal reception level is lower than the threshold value, it is detected that a transmission path estimation preamble with a larger number of symbols (here, two) has been inserted in the received signal. Subsequent operation by selection section 1803 is the same as in Embodiment 1, and a detailed description is omitted here.

Thus, in this embodiment, the number of transmission path estimation preamble symbols selected by a communicating party is not recognized by means of notification from that communicating party, but is estimated by means of the reception level of a signal transmitted by that communicating party. By this means, transmission of information indicating the number of transmission path estimation preamble symbols is rendered unnecessary, thereby making it possible to further prevent a fall in transmission efficiency. Moreover, estimating the number of transmission path estimation preambles selected by the above-mentioned communicating party without using a correlator enables the circuit scale to be reduced compared with Embodiment 6.

EMBODIMENT 9

In this embodiment, a case is described where the number of transmission path estimation preamble symbols selected by a communicating party is not recognized by means of notification from that communicating party, but is estimated using a signal transmitted by that communicating party, while processing delay is reduced.

In Embodiment 6, the number of transmission path estimation preamble symbols selected by a communicating party is estimated using a correlation value between a received signal for that communicating party and an IFFT-processed transmission path estimation preamble. In this case, a processing delay time equivalent to one OFDM signal occurs.

Figure 20:
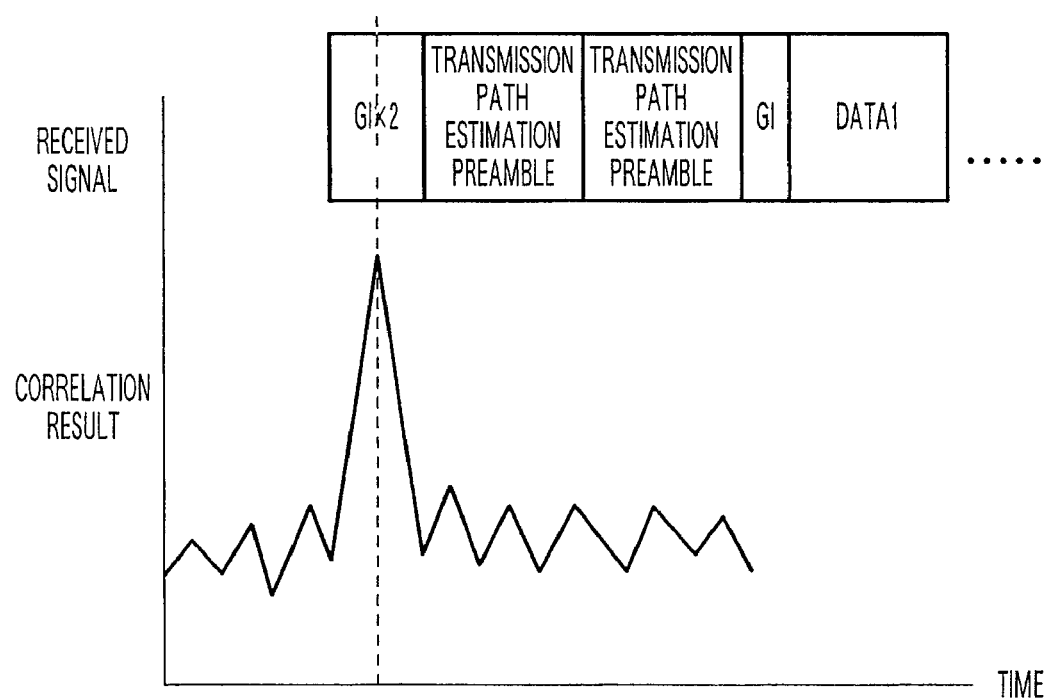
FIG. 20 is a schematic diagram illustrating a burst unit signal format in an OFDM communication apparatus according to Embodiment 9 of the present invention.

In the above embodiment, when a transmission path estimation preamble whose number of symbols is 2 is used, the kind of format shown in FIG. 5 is used. Recently, the kind of format shown in FIG. 20 has been proposed as a format for use when a transmission path estimation preamble whose number of symbols is 2 is used. FIG. 20 is a schematic diagram illustrating a burst unit signal format in an OFDM communication apparatus according to Embodiment 9 of the present invention.

As shown in FIG. 20, the first transmission path estimation preamble symbol serves as a guard interval for the second transmission path estimation preamble symbol. Thus, it is not necessary to insert a guard interval between the first transmission path estimation preamble symbol and the second transmission path estimation preamble symbol. Therefore, in the format shown in FIG. 20, unlike the format shown in FIG. 5, two guard intervals are inserted together immediately before the first transmission path estimation preamble symbol. Thus, in this embodiment, a case is described where the kind of format shown in FIG. 20 is used when using a transmission path estimation preamble whose number of symbols is 2.

When a communicating party performs transmission in accordance with the kind of format shown in FIG. 20 (that is, when a transmission path estimation preamble whose number of symbols is 2 is inserted in a burst unit signal), a peak of a predetermined size occurs in correlation values between the received signal and guard intervals at a timing corresponding to the center of the guard intervals, as shown in FIG. 20. On the other hand, when a communicating party performs transmission in accordance with the kind of format shown in FIG. 6 (that is, when a transmission path estimation preamble whose number of symbols is 1 is inserted in a burst unit signal), the above-mentioned peak of a predetermined size does not occur in correlation values between the received signal and guard intervals. In this embodiment, the number of transmission path estimation preamble symbols selected by a communicating party is estimated using a correlation value between a received signal and guard interval.

Figure 21:
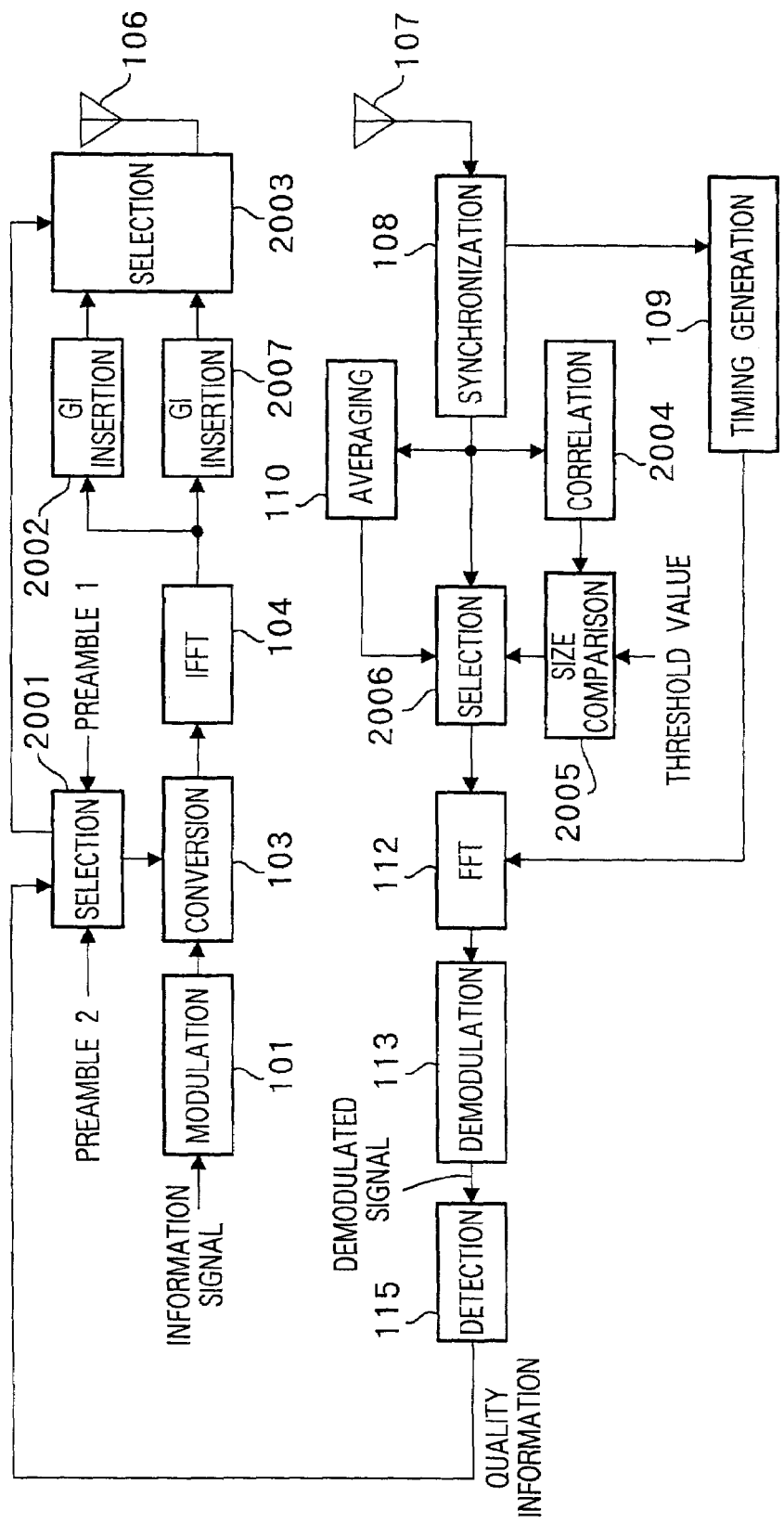
FIG. 21 is a block diagram showing the configuration of an OFDM communication apparatus according to Embodiment 9 of the present invention.

FIG. 21 is a block diagram showing the configuration of an OFDM communication apparatus according to Embodiment 9 of the present invention. Parts in FIG. 21 identical to those in Embodiment 1 (FIG. 3) are assigned the same codes as in FIG. 3 and their detailed explanations are omitted.

An OFDM communication apparatus according to this embodiment has a configuration wherein, in an OFDM communication apparatus according to Embodiment 1, the memory 114 is eliminated, a selection section 2001 is used instead of selection section 102, a selection section 2006 is used instead of selection section 111, a GI insertion section 2002 and GI insertion section 2007 are used instead of GI insertion section 105, and a selection section 2003, correlation section 2004, and size comparison section 2005 are additionally provided.

Selection section 2001 has the same kind of configuration as selection section 102 in Embodiment 1 (FIG. 3), except that it notifies the transmission path estimation preamble selection result to selection section 2003.

GI insertion section 2002 inserts guard intervals in a generated OFDM signal in accordance with the kind of format shown in FIG. 20, and generates a transmit signal. GI insertion section 2007 inserts guard intervals in a generated OFDM signal in accordance with the kind of format shown in FIG. 6, and generates a transmit signal.

Selection section 2003 selects an OFDM signal with guard intervals inserted by GI insertion section 2007 or GI insertion section 2002 as the transmit signal, based on the result of transmission path estimation preamble selection by selection section 2001.

The correlation section 2004 outputs a correlation value between the received signal from a synchronization section 108 and guard intervals. The size comparison section 2005 compares a peak in correlation values calculated by the correlation section 2004 with a threshold value. Selection section 2006 has the same kind of configuration as selection section 111 in Embodiment 1, except that it outputs either a received signal from the synchronization section 108 or an averaged received signal from an averaging section 110 based on the result of a comparison by the size comparison section 2005.

Next, the operation of an OFDM communication apparatus that has the above configuration will be described, considering only points of difference from Embodiment 1. In the transmitting system in this embodiment, unlike Embodiment 1, information indicating the number of transmission path estimation preamble symbols selected by selection section 2001 is not sent to a communicating party either at the start of communication or at predetermined time intervals. Also, the result of transmission path estimation preamble selection by selection section 2001 is output to selection section 2003.

In GI insertion section 2002, a transmit signal is generated by inserting guard intervals in an OFDM signal generated by an IFFT section 104 in accordance with the kind of format shown in FIG. 20. In GI insertion section 2007, a transmit signal is generated by inserting guard intervals in an OFDM signal generated by the IFFT section 104 in accordance with the kind of format shown in FIG. 6. The guard interval inserted immediately before a transmission path estimation preamble in the format shown in FIG. 20 is generated by providing two consecutive guard intervals inserted immediately before a transmission path estimation preamble in the format shown in FIG. 6.

In selection section 2003, the transmit signal generated by either GI insertion section 2002 or GI insertion section 2007 is selected as the transmit signal to be actually transmitted based on the result of transmission path estimation preamble selection by selection section 2001. Specifically, when a transmission path estimation preamble whose number of symbols is 2 (1) is selected by selection section 2001, the transmit signal generated by GI insertion section 2002 (GI insertion section 2007) is selected as the transmit signal to be transmitted. The transmit signal selected by selection section 2003 undergoes predetermined transmission processing, and is then transmitted to the communicating party via antenna 106.

Meanwhile, in the receiving system, a correlation value between a received signal from the synchronization section 108 and a guard interval is calculated in the correlation section 2004. It goes without saying that a guard interval here has the same signal pattern as a guard interval used by GI insertion section 2007 or S/P conversion section 2002 in the transmitting system.

In the size comparison section 2005, a peak in the correlation values calculated by the correlation section 2004 is compared with a threshold value. The result of the comparison is output to selection section 2006. In selection section 2006, the number of transmission path estimation preamble symbols is detected based on the result of the comparison by the size comparison section 2005. That is to say, when a peak of predetermined size occurs in the correlation values, it is recognized that the number of transmission path estimation preamble symbols is 2, and when a peak of predetermined size does not occur in the correlation values, it is recognized that the number of transmission path estimation preamble symbols is 1. Subsequent operation by selection section 2006 is the same as in Embodiment 1, and a detailed description is omitted here.

Thus, in this embodiment, in the transmitting system the number of guard interval symbols (in this embodiment, 1 or 2) inserted in a predetermined position in a burst unit signal (in this embodiment, in the leading part of the burst unit signal) is varied in accordance with the number of transmission path estimation preamble symbols selected according to channel quality. Also, in the receiving system, the number of transmission path estimation preamble symbols selected by a communicating party is estimated in accordance with the number of peaks of predetermined size in correlation values between a received signal and guard intervals. By this means, transmission of information indicating the number of transmission path estimation preamble symbols is rendered unnecessary, thereby making it possible to further prevent a fall in transmission efficiency.

Moreover, as a correlation value with a received signal is calculated using guard intervals instead of transmission path estimation preambles, and the number of transmission path estimation preamble symbols selected by a communicating party is estimated using the calculated correlation value, the processing delay time incurred can be reduced to a greater extent than in Embodiment 6.

Furthermore, the total number of multipliers, adders, and delayers required to configure the correlation section 2004 (number of guard interval samples/2) can be made smaller than the total number of multipliers, adders, and delayers required to configure a synchronization section 108.

EMBODIMENT 10

In this embodiment, a case is described where the number of transmission path estimation preamble symbols selected by a communicating party is not recognized by means of notification from that communicating party, but is estimated using a signal transmitted by that communicating party, while the apparatus scale is reduced.

In Embodiment 9, the number of guard interval symbols inserted in a burst unit signal is varied in accordance with the selected number of transmission path estimation preamble symbols. Therefore, in Embodiment 9, there is a possibility of processing in the transmitting system becoming complex.

Thus, in this embodiment, the transmission path estimation preamble signal pattern inserted in a burst unit signal is varied in accordance with the selected number of transmission path estimation preamble symbols.

Figure 22:
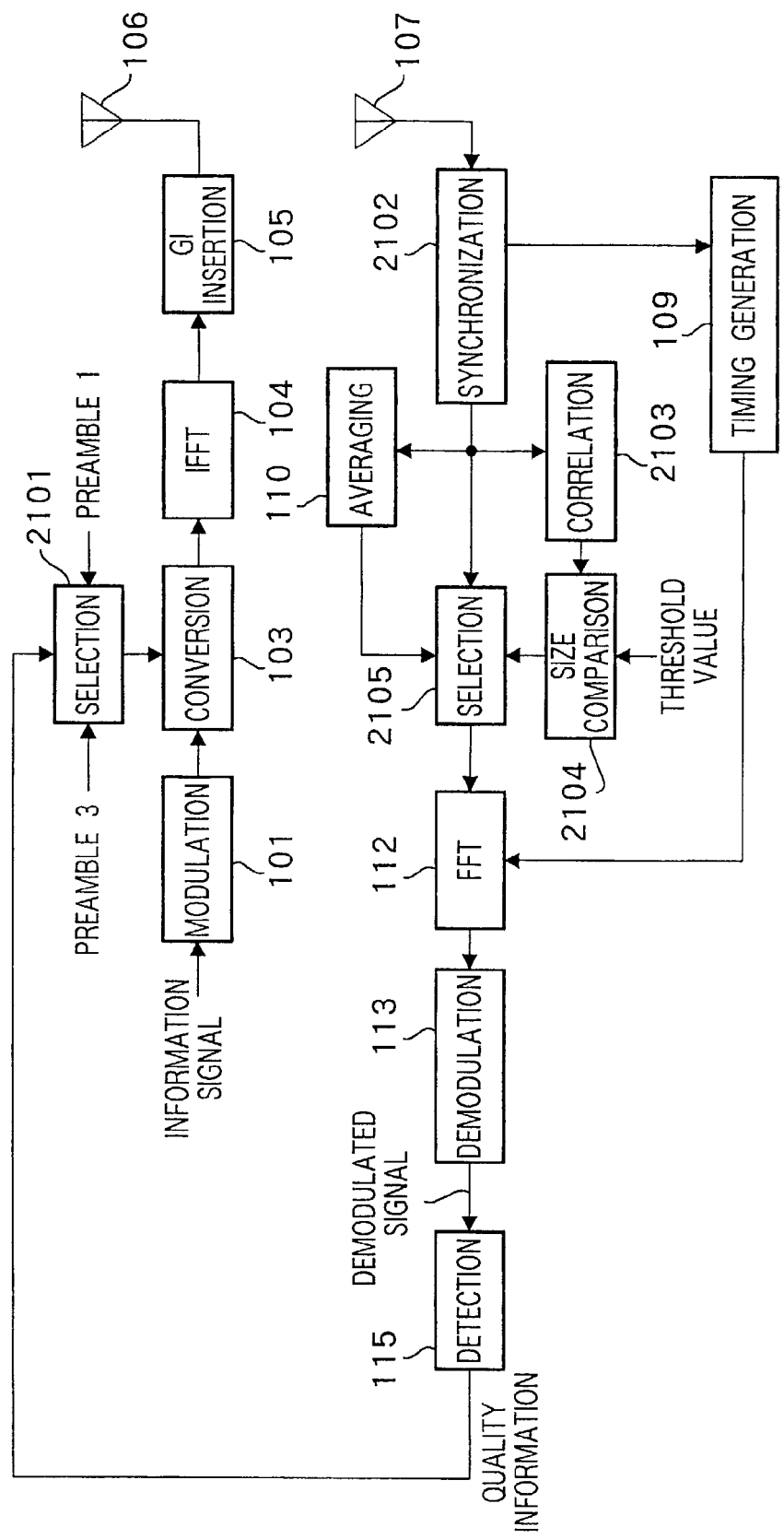
FIG. 22 is a block diagram showing the configuration of an OFDM communication apparatus according to Embodiment 10 of the present invention.

FIG. 22 is a block diagram showing the configuration of an OFDM communication apparatus according to Embodiment 10 of the present invention. Parts in FIG. 22 identical to those in Embodiment 1 (FIG. 3) are assigned the same codes as in FIG. 3 and their detailed explanations are omitted.

An OFDM communication apparatus according to this embodiment has a configuration wherein, in an OFDM communication apparatus according to Embodiment 1, the memory 114 is eliminated, a selection section 2101 is used instead of selection section 102, a synchronization section 2102 is used instead of synchronization section 108, a selection section 2105 is used instead of selection section 111, and a correlation section 2103 and size comparison section 2104 are additionally provided.

Selection section 2101 has the same kind of configuration as selection section 102 in Embodiment 1, except that it outputs either transmission path estimation preamble 1 or transmission path estimation preamble 3 to a conversion section 103 based on quality information from a detection section 115. Here, transmission path estimation preamble 3 has a signal length twice that of transmission path estimation preamble 1 (that is, the same signal length as above-mentioned transmission path estimation preamble 2), and has a different signal pattern from that of transmission path estimation preamble 1. Specifically, transmission path estimation preamble 3 is generated by combining two signals that have the same signal length as transmission path estimation preamble 1 and have different signal patterns. Here, the number of symbols of transmission path estimation preamble 1 is 1, and the number of symbols of transmission path estimation preamble 3 is 2.

The synchronization section 2102 has the same kind of configuration as synchronization section 108 in Embodiment 1, except that it does not only calculate a correlation value between a received signal and IFFT-processed transmission path estimation preamble 1, but also calculates a correlation value between the received signal and IFFT-processed transmission path estimation preamble 3, and detects the timing at which each correlation value is at a maximum.

The correlation section 2103 calculates a correlation value between the received signal from synchronization section 2102 and transmission path estimation preamble 3. The size comparison section 2104 compares a peak of predetermined size in correlation values calculated by the correlation section 2103 with a threshold value. Selection section 2105 has the same kind of configuration as selection section 111 in Embodiment 1, except that it outputs either a received signal from the synchronization section 2102 or an averaged received signal from the averaging section 110 based on the result of a comparison by the size comparison section 2104.

Next, the operation of an OFDM communication apparatus that has the above configuration will be described, considering only points of difference from Embodiment 1. In the transmitting system, when the quality of a demodulated signal in the receiving system is greater than or equal to a threshold value, transmission path estimation preamble 1 is selected. Conversely, when the quality of a demodulated signal in the receiving system is less than the threshold value, transmission path estimation preamble 3 is selected. The selected transmission path estimation preamble is output to the conversion section 103.

Meanwhile, in the receiving system, a correlation value between the received signal and transmission path estimation preamble 1 and a correlation value between the received signal and transmission path estimation preamble 3 are calculated by the synchronization section 2102. Also, the timing at which each calculated correlation value is at a maximum is detected. By this means, the timing at which a correlation value is at a maximum is detected when either transmission path estimation preamble 1 or transmission path estimation preamble 3 is inserted in a received signal. The detected timings are output to a timing generation section 109.

In the correlation section 2103, a correlation value between the received signal from the correlation section 2103 and the transmission path estimation preamble is calculated. Here, when transmission path estimation preamble 3 is used by the communicating party, a peak of a predetermined size occurs in calculated correlation values. Conversely, when transmission path estimation preamble 1 is used by the communicating party, a peak of a predetermined size does not occur in calculated correlation values. The calculated correlation value is output to the size comparison section 2104.

In the size comparison section 2104, a peak in correlation values calculated by the correlation section 2103 is compared with a threshold value. The result of the comparison is output to selection section 2105.

In selection section 2105, the number of transmission path estimation preamble symbols (that is, the transmission path estimation preamble used by the communicating party) is detected based on the result of the comparison by the size comparison section 2104. That is to say, when a peak of a predetermined size occurs in the correlation values, it is recognized that the number of transmission path estimation preamble symbols is 2 (that is, that transmission path estimation preamble 3 has been used by the communicating party), and when a peak of a predetermined size does not occur in the correlation values, it is recognized that the number of transmission path estimation preamble symbols is 1 (that is, that transmission path estimation preamble 1 has been used by the communicating party). Subsequent operation by selection section 2105 is the same as in Embodiment 1, and a detailed description is omitted here.

Thus, in this embodiment, in the transmitting system the transmission path estimation preamble signal pattern inserted in a burst unit signal is varied in accordance with the number of transmission path estimation preamble symbols selected according to channel quality. Also, in the receiving system, a correlation value between a transmission path estimation preamble signal pattern used in the transmitting system (in this embodiment transmission path estimation preamble 3 is used, but it is also possible for transmission path estimation preamble 1 to be used) and a received signal is calculated, and the transmission path estimation preamble selected by the communicating party is estimated based on the number of peaks of predetermined size in the calculated correlation values.

By this means, transmission of information indicating the number of transmission path estimation preamble symbols is rendered unnecessary, thereby making it possible to further prevent a fall in transmission efficiency. Moreover, the guard interval insertion method in the transmitting system is unrelated to the selected number of transmission path estimation preamble symbols, and therefore the apparatus configuration can be simplified compared with Embodiment 9.

EMBODIMENT 11

Figure 23:
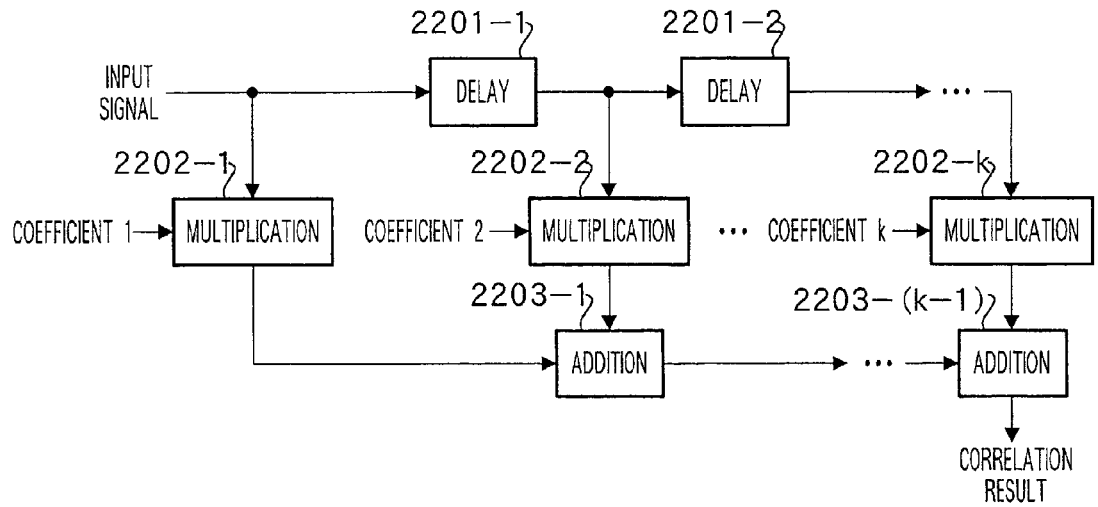
FIG. 23 is a block diagram showing a sample configuration of a correlator used in an OFDM communication apparatus.
Figure 24:
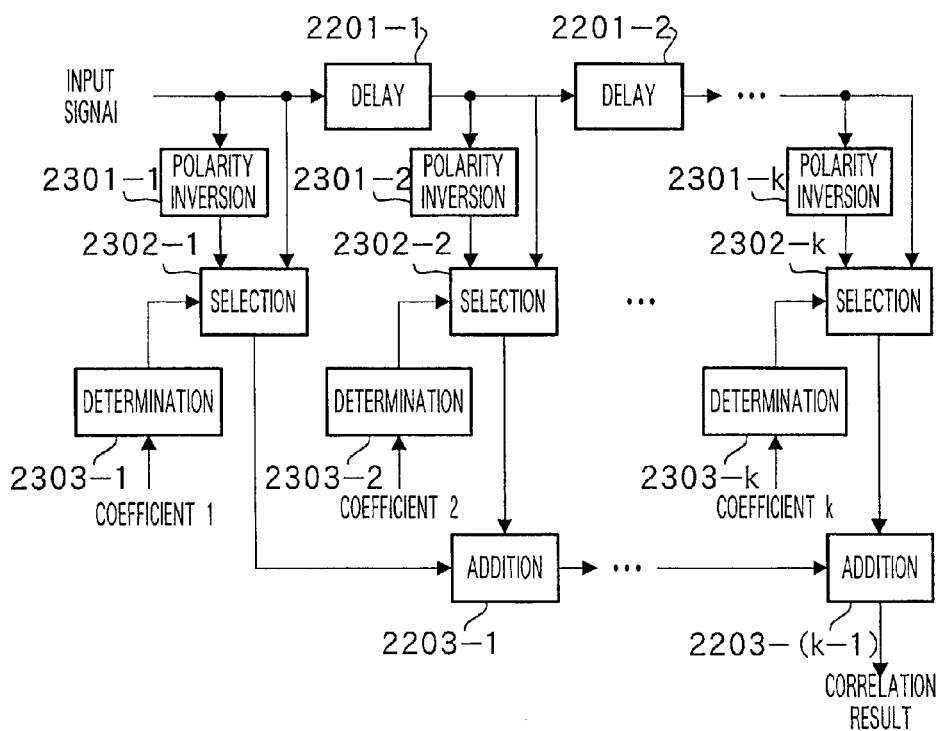
FIG. 24 is a block diagram showing the configuration of the correlator used in an OFDM communication apparatus according to Embodiment 11 of the present invention.

In this embodiment, a case is described, with reference to FIG. 23 and FIG. 24, where the correlator in Embodiment 1 through Embodiment 10 is configured without using multipliers, thus reducing the circuit scale. FIG. 23 is a block diagram showing a sample configuration of a correlator used in an OFDM communication apparatus, and FIG. 24 is a block diagram showing the configuration of the correlator used in an OFDM communication apparatus according to Embodiment 11 of the present invention. In FIG. 23 and FIG. 24, the input signal corresponds to a received signal from an antenna 107, and coefficient 1 through coefficient k correspond to an IFFT-processed transmission path estimation preamble.

As shown in FIG. 23, multipliers are predominant in the configuration of a correlator used in Embodiment 1 through Embodiment 10 above. Configuring a correlator that does not use multipliers is effective in reducing the circuit scale of the correlator.

An IFFT-processed transmission path estimation preamble is a multicarrier signal, and therefore its polarity varies abruptly according to the sample point. Thus, signals obtained by means of a hard decision of an IFFT-processed transmission path estimation preamble can be used as coefficient 1 through coefficient k.

In FIG. 24, determination section 2303-n (n=1 to k) performs a hard decision on coefficient n in an IFFT-processed transmission path estimation preamble, and outputs the hard decision result to selection section 2302-n.

A received signal delayed by delay section 2201-(n−1) and a signal produced by polarity inversion of this delayed received signal by polarity inversion section 2301-n (hereinafter referred to as "inverted-polarity signal") are input to selection section 2302-n. However, a received signal that has not been delayed is input to delay section 2201-1. Each delay section (in FIG. 24, delay section 2201-1 and delay section 2201-2) delays the received signal by a predetermined time.

When the hard decision result from determination section 2303-n is "1", selection section 2302-n outputs the received signal delayed by delay section 2201-(n−1) to addition section 2203-(n−1). Conversely, when the hard decision result from determination section 2303-n is "0", selection section 2302-n outputs the inverted-polarity signal from polarity inversion section 2301-n to addition section 2203-(n−1).

Addition section 2203-n adds the signal selected by selection section 2302-n and the signal selected by selection section 2302-(n+1). Also, addition section 2203-n (n≠k) outputs the signal resulting from the addition to addition section 2203-(n+1). However, addition section 2203-(k−1) outputs the signal resulting from the addition as the correlation result.

Thus, according to this embodiment, a correlator is configured without using multipliers, thus enabling the apparatus scale to be reduced compared with Embodiment 1 through Embodiment 10.

EMBODIMENT 12

In this embodiment, a case is described where OFDM-CDMA communication is applied to Embodiment 1 through Embodiment 10. OFDM-CDMA communication can be applied to any of Embodiments 1 through 10. In this embodiment, a case where OFDM-CDMA communication is applied to Embodiment 1 will be described as an example, with reference to FIG. 25.

Figure 25:
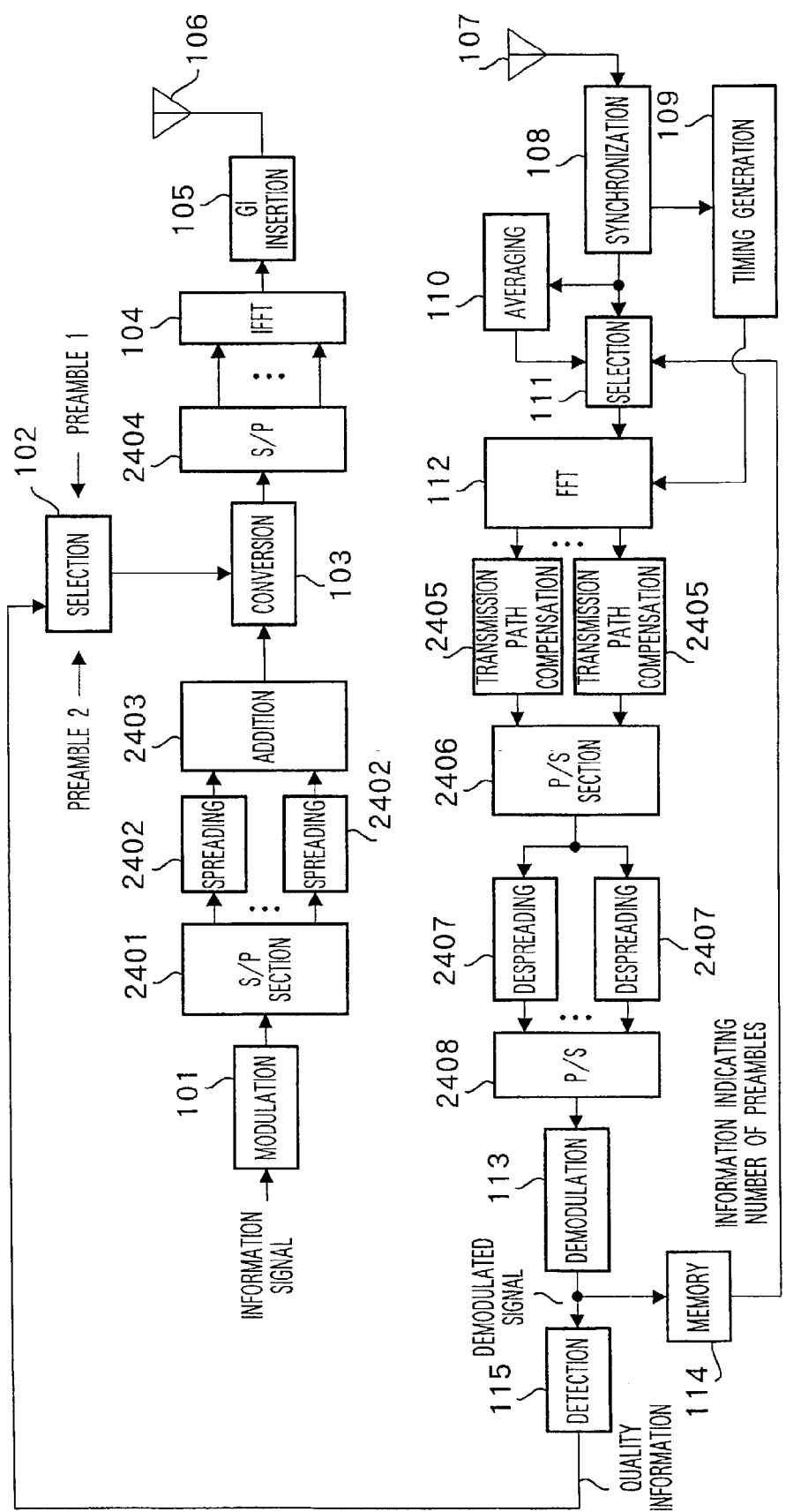
FIG. 25 is a block diagram showing the configuration of an OFDM communication apparatus according to Embodiment 12 of the present invention.

FIG. 25 is a block diagram showing the configuration of an OFDM communication apparatus according to Embodiment 12 of the present invention. Parts in FIG. 25 identical to those in Embodiment 1 (FIG. 3) are assigned the same codes as in FIG. 3 and their detailed explanations are omitted.

In the transmitting system, a serial/parallel conversion section (hereinafter referred to as "S/P section") 2401 converts an information signal that has undergone modulation processing from a single-sequence signal to a plurality of sequences of signals. For the sake of simplicity, the number of sequences will be designated n. Sequence 1 through sequence n signals are output to sequence-specific spreading sections 2402. Spreading sections 2402 perform spreading processing on sequence 1 through sequence n signals using spreading code 1 through spreading code n respectively. An addition section 2403 multiplexes sequence 1 through sequence n signals that have undergone spreading processing. By this means a code-multiplexed signal (hereinafter referred to as "multiplex signal") is obtained. The multiplex signal is output to a conversion section 103.

An S/P section 2404 decomposes the signal from the conversion section 103 (a multiplex signal from the addition section 2403 or a transmission path estimation preamble from a selection section 102) for each despread signal (that is, on a chip-by-chip basis) and generates a plurality of sequences of signals equivalent to the spreading ratio (k). That is to say, S/P section 2404 generates a first chip through k'th chip of the signal from the conversion section 103 as a plurality of sequences of signals.

An IFFT section 104 performs frequency division multiplexing processing by executing IFFT processing on the first chip through k'th chip of the signal from the conversion section 103. That is to say, the IFFT section 104 generates an OFDM signal in which the above-mentioned first chip through k'th chip are superimposed on subcarrier 1 through subcarrier k respectively. The generated OFDM signal is output to a GI insertion section 105.

Meanwhile, in the receiving system, an FFT section 112 extracts signals transmitted by subcarrier 1 through subcarrier k by performing FFT processing on a received signal from a selection section 111 based on a timing signal generated by a timing generation section 109. Transmission path compensation sections 2405 perform transmission path compensation processing on signals transmitted by subcarrier 1 through subcarrier k. Details of this transmission path compensation processing will be given later herein.

A parallel/serial conversion section (hereinafter referred to as "P/S section") 2406 converts a plurality of sequences of signals that have undergone transmission path compensation (that is, signals transmitted by subcarrier 1 through subcarrier k) to a single-sequence signal, and outputs this to despreading sections 2407. That is to say, P/S section 2406 outputs the first chip in the signal from each transmission path compensation section 2405 in time t1, and outputs the k'th chip in that signal in time tk.

Despreading sections 2407 generate demodulated signal 1 through demodulated signal n by performing despreading processing on the single-sequence signal from P/S section 2406 using despreading code 1 through spreading code n respectively. A P/S section 2408 converts demodulated signal 1 through demodulated signal n (that is, a plurality of sequences of signals) from despreading sections 2407 to a single-sequence signal, and output this to a demodulation section 113 as a demodulated signal.

Figure 26:
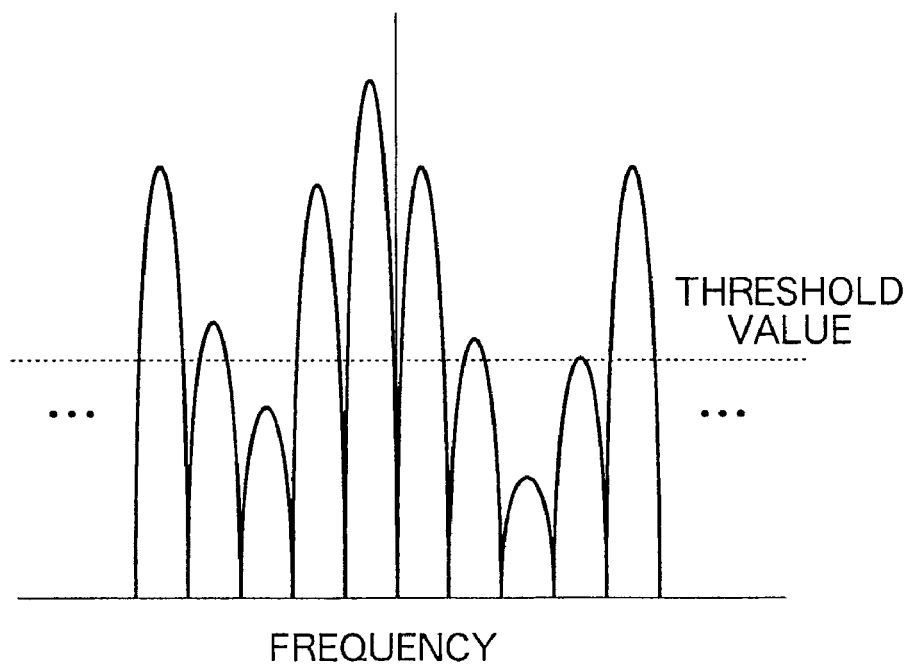
FIG. 26 is a schematic diagram illustrating reception levels of signals transmitted by each subcarrier in an OFDM communication apparatus according to Embodiment 12 of the present invention (first example)
Figure 27:
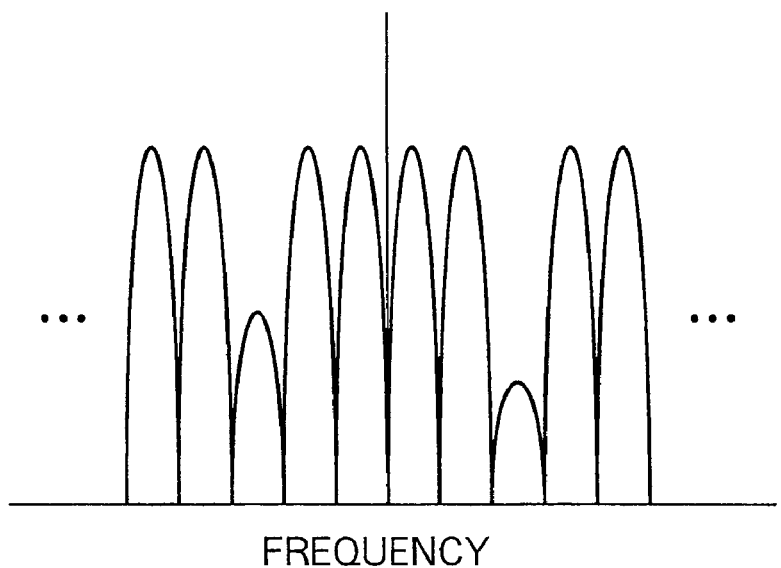
FIG. 27 is a schematic diagram illustrating reception levels of signals transmitted by each subcarrier in an OFDM communication apparatus according to Embodiment 12 of the present invention (second example)
Figure 28:
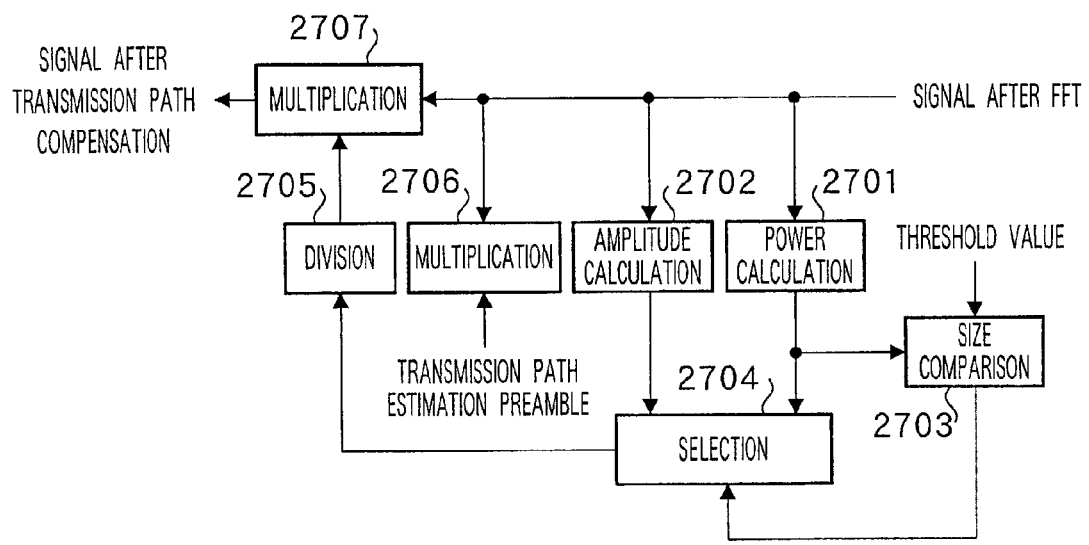
FIG. 28 is a block diagram showing the configuration of the transmission path compensation section in an OFDM communication apparatus according to Embodiment 12 of the present invention.

Next, details of the transmission path compensation section 2405 will be given with reference to FIG. 26 through FIG. 28. FIG. 26 is a schematic diagram illustrating reception levels of signals transmitted by each subcarrier in an OFDM communication apparatus according to Embodiment 12 of the present invention (first example), FIG. 27 is a schematic diagram illustrating reception levels of signals transmitted by each subcarrier in an OFDM communication apparatus according to Embodiment 12 of the present invention (second example), and FIG. 28 is a block diagram showing the configuration of the transmission path compensation section 2405 in an OFDM communication apparatus according to Embodiment 12 of the present invention.

In a normal OFDM system, when transmission path compensation is performed, phase and amplitude compensation is carried out for signals transmitted by each subcarrier. However, in an OFDM-CDMA system, each chip (here, the first chip through k'th chip) of a code-division-multiplexed signal (here, multiplex signal) is superimposed on a different subcarrier. Therefore, if phase and amplitude compensation is carried out for signals transmitted by each subcarrier, a frequency diversity effect is no longer obtained.

On the other hand, when only phase compensation is carried out for signals transmitted by each subcarrier, orthogonality is lost between spreading codes. It therefore becomes necessary to decrease the level of code multiplexing (that is, the total number of signals multiplexed by the addition section 2403 in FIG. 25), and consequently spectral efficiency falls. As explained above, in an OFDM-CDMA system it is difficult to perform the transmission path compensation used in a normal OFDM system.

Thus, in this embodiment, it is determined whether phase compensation only, or phase and amplitude compensation, is to be performed on signals transmitted by each subcarrier, in accordance with the reception level (for example, the average reception level) of signals transmitted by each subcarrier. Specifically, when the above-mentioned reception level is greater than or equal to a threshold value (FIG. 27), phase and amplitude compensation is performed on signals transmitted by each subcarrier, and, conversely, when that reception level is less than the threshold value (FIG. 27), only phase compensation is performed on signals transmitted by each subcarrier. By this means, it is possible to achieve both an improvement in frequency diversity effect and an improvement in spectral efficiency. In a normal OFDM system, a plurality of signals cannot be multiplexed in a signal transmitted by one subcarrier, and therefore the above-described effects cannot be obtained.

A transmission path compensation circuit according to this embodiment will now be described with reference to FIG. 28. Here, of the k transmission path compensation circuits provided, the transmission path compensation circuit that performs transmission path compensation for the signal transmitted by subcarrier k will be considered as an example. A post-FFT signal—that is, a signal transmitted by subcarrier k—is output to a power calculation section 2701, amplitude calculation section 2702, multiplication section 2706, and multiplication section 2707. The power calculation section 2701 calculates the power of the signal transmitted by subcarrier k, and outputs the calculated power to a size comparison section 2703 and selection section 2704. The amplitude calculation section 2702 calculates the amplitude of the signal transmitted by subcarrier k, and outputs the calculated amplitude to the selection section 2704.

The size comparison section 2703 compares the power (for example, average power) calculated by the power calculation section 2701 with a threshold value, and outputs the result of the comparison to the selection section 2704. Based on the result of the comparison by the size comparison section 2703, the selection section 2704 outputs either the power calculated by the power calculation section 2701 or the amplitude calculated by the amplitude calculation section 2702 to a division section 2705. Specifically, the selection section 2704 outputs the power calculated by the power calculation section 2701 to the division section 2705 when that power is greater than or equal to a threshold value, and conversely, outputs the amplitude calculated by the amplitude calculation section 2702 to the division section 2705 when the above-mentioned power is less than the threshold value.

Multiplication section 2706 performs multiplication of the signal transmitted by subcarrier k and the transmission path estimation preamble, by which means a transmission path estimation result is obtained. The obtained transmission path estimation result is output to the division section 2705.

The division section 2705 performs division on the transmission path estimation result from multiplication section 2706 using the calculated amplitude or power from the selection section 2704. The result of the division is output to multiplication section 2707. Multiplication section 2707 multiplies the signal transmitted by subcarrier k by the result of the division by the division section 2705. By this means a signal that has undergone transmission path compensation is obtained.

As explained above, it is possible to apply OFDM-CDMA communication to Embodiment 1 through Embodiment 10. In this case, it is possible to achieve both an improvement in frequency diversity effect and an improvement in spectral efficiency by performing only phase compensation, or phase and amplitude compensation, for a signal transmitted by a predetermined subcarrier, in accordance with the reception level of the signal transmitted by that predetermined subcarrier.

An OFDM communication apparatus according to the above embodiments can be installed in a communication terminal apparatus and base station apparatus in a digital mobile communication system. By this means, that communication terminal apparatus and base station apparatus can achieve both an improvement in demodulated signal error rate characteristics and an improvement in information signal transmission efficiency, thus enabling good communication to be performed efficiently.

In the above embodiments, a case has been described where the present invention is applied to an OFDM communication apparatus that executes inverse fast Fourier transform (IFFT) processing on the transmitting side and also executes fast Fourier transform (FFT) processing on the receiving side, but the present invention can also be applied to an OFDM communication apparatus that executes inverse discrete Fourier transform (IDFT) processing on the transmitting side and also executes discrete Fourier transform (DFT) processing on the receiving side. The key point is that the present invention can be widely applied to OFDM communication apparatuses that perform inverse Fourier transform processing on the transmitting side and perform Fourier transform processing on the receiving side.

The present invention is not limited to the above-described embodiments, and various variations and modifications may be possible without departing from the scope of the present invention.

An OFDM communication apparatus of the present invention has a configuration comprising determining section that determine a number of known signals for transmission path estimation to be inserted in a transmit signal based on channel quality with respect to a communicating party, and generating section that perform inverse Fourier transform processing on an information signal and the number of known signals for transmission path estimation determined by the determining section and generating a transmit signal for the communicating party.

An OFDM communication apparatus of the present invention has a configuration wherein determining section estimates a deterioration factor for a demodulated signal at a communicating party using channel quality with respect to the communicating party, and determines a number of known signals for transmission path estimation based on the estimated deterioration factor.

According to these configurations, it is possible to achieve both an improvement in demodulated signal error rate characteristics and an improvement in information signal transmission efficiency.

An OFDM communication apparatus of the present invention has a configuration wherein determining section detects channel quality with respect to a communicating party using a reception level in the OFDM communication apparatus itself or a reception level at the communicating party.

An OFDM communication apparatus of the present invention has a configuration wherein determining section detects channel quality with respect to a communicating party using received signal delay variance in the OFDM communication apparatus itself or received signal delay variance at the communicating party.

An OFDM communication apparatus of the present invention has a configuration further comprising delay variance detecting section that detect received signal delay variance, wherein determining section detects channel quality with respect to a communicating party using the result of normalizing received signal delay variance in the OFDM communication apparatus itself according to the level of the received signal, or the result of normalizing received signal delay variance at a communicating party according to the level of the received signal at the communicating party.

According to these configurations, channel quality with respect to a communicating party can be detected reliably, and it is therefore possible to achieve both an improvement in demodulated signal error rate characteristics and an improvement in information signal transmission efficiency.

An OFDM communication apparatus of the present invention has a configuration wherein determining section determines a number of known signals for transmission path estimation based on the total number of communicating parties.

According to this configuration, by increasing the number of known signals for transmission path estimation inserted in a transmit signal for a predetermined communicating party when the total number of communicating parties actually performing communication is small, it is possible to reduce time slots not used for communication in each frame, and it is also possible to improve demodulated signal error rate characteristics for the predetermined communicating party. Conversely, by decreasing the number of known signals for transmission path estimation inserted in a transmit signal for a predetermined communicating party when the total number of communicating parties actually performing communication is large, it is possible to increase the total number transmit signals contained in each frame, and so improve transmission efficiency. It is therefore possible to achieve both an improvement in demodulated signal error rate characteristics and an improvement in information signal transmission efficiency.

An OFDM communication apparatus of the present invention has a configuration wherein determining section determines a number of known signals for transmission path estimation to be inserted in a transmit signal based on a communication channel used for transmission of the transmit signal to a communicating party.

According to this configuration, it is possible to improve the demodulated signal error rate in a specific channel for which better communication quality is required with almost no effect on overall transmission efficiency.

An OFDM communication apparatus of the present invention has a configuration wherein determining section increases the number of known signals for transmission path estimation on a fixed basis when channel quality with respect to a communicating party is poor.

According to this configuration, it is possible to identify reliably the number of known signals for transmission path estimation contained in a received signal, and so to prevent deterioration of demodulated signal error rate characteristics.

An OFDM communication apparatus of the present invention has a configuration comprising receiving section that receive a transmit signal obtained by performing inverse Fourier transform processing of a signal containing a number of known signals for transmission path estimation determined in accordance with channel quality with respect to a communicating party, detecting section that detect the number of known signals for transmission path estimation inserted in the transmit signal based on correlation values between a received signal and known signals for transmission path estimation that have undergone inverse Fourier transform processing, and demodulating section that perform transmission path compensation on the received signal based on the number of known signals for transmission path estimation detected by the detecting section and demodulating the received signal.

According to this configuration, the number of known signals for transmission path estimation selected by a communicating party is not identified by section of notification from the communicating party, but is estimated by section of a correlation value calculated using a signal transmitted by the communicating party. By this section, transmission of information indicating the number of known signals for transmission path estimation is rendered unnecessary, thereby making it possible to further prevent a fall in transmission efficiency.

An OFDM communication apparatus of the present invention has a configuration comprising receiving section that receive a transmit signal obtained by performing inverse Fourier transform processing of a signal containing a number of known signals for transmission path estimation determined in accordance with channel quality with respect to a communicating party, detecting section that detect the number of known signals for transmission path estimation inserted in the transmit signal based on the received signal reception level, and demodulating section that perform transmission path compensation on the received signal based on the number of known signals for transmission path estimation detected by the detecting section and demodulating the received signal.

According to this configuration, the number of known signals for transmission path estimation selected by a communicating party is not identified by section of notification from the communicating party, but is estimated based on the reception level of a signal transmitted by the communicating party.

By this means, transmission of information indicating the number of known signals for transmission path estimation is rendered unnecessary, thereby making it possible to further prevent a fall in transmission efficiency.

An OFDM communication apparatus of the present invention has a configuration wherein generating section inserts guard intervals based on a number determined by determining section in predetermined positions in a transmit signal.

An OFDM communication apparatus of the present invention has a configuration comprising detecting section that detect, based on correlation values between a received signal for a transmit signal of the OFDM communication apparatus and guard intervals, the number of known signals for transmission path estimation inserted in the transmit signal, and demodulating section that perform transmission path compensation on the received signal based on the number of known signals for transmission path estimation detected by the detecting section and demodulating the received signal.

According to these configurations, in the transmitting system, the number of guard intervals inserted in predetermined positions in a transmit signal is varied in accordance with the number of known signals for transmission path estimation selected according to channel quality. Also, in the receiving system, the number of known signals for transmission path estimation selected by a communicating party is estimated in accordance with the number of peaks of predetermined size in correlation values between a received signal and guard intervals. By this means, transmission of information indicating the number of known signals for transmission path estimation is rendered unnecessary, thereby making it possible to further prevent a fall in transmission efficiency.

An OFDM communication apparatus of the present invention has a configuration wherein generating section varies the signal pattern of a known signal for transmission path estimation based on a number determined by determining section.

An OFDM communication apparatus of the present invention has a configuration comprising detecting section that detect, based on correlation values between a received signal for a transmit signal of the OFDM communication apparatus and signals resulting from inverse Fourier transform processing of known signals for transmission path estimation used by generating section, the number of known signals for transmission path estimation inserted in the transmit signal, and demodulating section that perform transmission path compensation on the received signal based on the number of known signals for transmission path estimation detected by the detecting section and demodulating the received signal.

According to these configurations, in the transmitting system, the signal pattern of a known signal for transmission path estimation inserted in a transmit signal is varied in accordance with the number of known signals for transmission path estimation selected based on channel quality. Also, in the receiving system, a correlation value between the signal pattern of a known signal for transmission path estimation used in the transmitting system and a received signal is calculated, and the known signal for transmission path estimation selected by a communicating party is estimated in accordance with the number of peaks of predetermined size in calculated correlation values. By this means, transmission of information indicating the number of known signals for transmission path estimation is rendered unnecessary, thereby making it possible to further prevent a fall in transmission efficiency.

An OFDM communication apparatus of the present invention has a configuration wherein generating section comprises converting section that convert an information signal from a single-sequence signal to a plurality of sequences of signals, spreading section that perform spreading processing on the signal of each sequence using mutually different spreading codes, and multiplexing section that multiplies sequences of signals that have undergone spreading processing and generating a multiplex signal; and inverse Fourier transform processing is performed using the generated multiplex signal and the number of known signals for transmission path estimation determined by determining section.

According to this configuration, the above-described OFDM communication apparatus can also be applied to OFDM-CDMA communications.

A communication terminal apparatus of the present invention has a configuration provided with an above-described OFDM communication apparatus. A base station apparatus of the present invention has a configuration provided with an above-described OFDM communication apparatus.

According to these configurations, by incorporating an OFDM communication apparatus that achieves both an improvement in demodulated signal error rate characteristics and an improvement in information signal transmission efficiency, it is possible to provide a communication terminal apparatus and base station apparatus that enable good communication to be performed efficiently.

An OFDM communication method of the present invention comprises a determining step of determining a number of known signals for transmission path estimation to be inserted in a transmit signal based on channel quality with respect to a communicating party, and a generating step of performing inverse Fourier transform processing on an information signal and the number of known signals for transmission path estimation determined in the determining step and generating a transmit signal for the communicating party.

In an OFDM communication method of the present invention, a determining step estimates a deterioration factor for a demodulated signal at a communicating party using channel quality with respect to the communicating party, and determines a number of known signals for transmission path estimation based on the estimated deterioration factor.

According to these methods, it is possible to achieve both an improvement in demodulated signal error rate characteristics and an improvement in information signal transmission efficiency.

As described above, an OFDM communication apparatus of the present invention can achieve both an improvement in demodulated signal error rate characteristics and an improvement in information signal transmission efficiency.

This application is based on Japanese Patent Application No. 2000-351766 filed on Nov. 17, 2000, entire contents of which are expressly incorporated by reference herein.

INDUSTRIAL APPLICABILITY

The present invention is applicable to cases where coherent detection is performed by an OFDM communication apparatus.

The invention claimed is:

1. An orthogonal frequency division multiplexing transmission apparatus for transmitting an orthogonal frequency division multiplexing signal including in all subcarriers known signals for transmission path estimation used for transmission path estimation by a communicating party, the orthogonal frequency division multiplexing transmission apparatus comprising:
   an information signal modulation section that modulates an information signal including user data transmitted in a user channel and an information signal formed with control data alone transmitted in a specific channel where higher communication quality than the user channel is required;

a determining section that determines the number of the known signals for transmission path estimation to be inserted in the information signal transmitted in the user channel and determines that the number of the known signals for transmission path estimation to be inserted in the information signal transmitted in the specific channel is greater than the number of the known signals for transmission path estimation to be inserted in the information signal transmitted in the user channel;

a transmission path estimation known signal inserting section that inserts the determined numbers of the known signals for transmission path estimation in the information signal of the user channel and the information signal of the specific channel; and a transmit signal generating section that generates an orthogonal frequency division multiplexing transmit signal by performing inverse Fourier transform processing on the information signals and the known signals for transmission path estimation outputted from the transmission path estimation known signal inserting section.

2. The orthogonal frequency division multiplexing transmission apparatus according to claim 1, wherein the determining section adaptively changes the number of the known signals for transmission path estimation to be inserted in the information signal transmitted in the user channel based on received quality.

3. The orthogonal frequency division multiplexing transmission apparatus according to claim 1, wherein the specific channel comprises broadcast channels, control channels or retransmission channels.

4. An orthogonal frequency division multiplexing transmission method of transmitting an orthogonal frequency division multiplexing signal including in all subcarriers known signals for transmission path estimation used for transmission path estimation by a communicating party, the orthogonal frequency division multiplexing transmission method comprising the steps of:

modulating an information signal including user data transmitted in a user channel and an information signal formed with control data alone transmitted in a specific channel where higher communication quality than the user first channel is required;

determining the number of the known signals for transmission path estimation to be inserted in the information signal transmitted in the user channel and determining that the number of the known signals for transmission path estimation to be inserted in the information signal transmitted in the specific channel is greater than the number of the known signals for transmission path estimation to be inserted in the information signal transmitted in the user channel; and inserting the determined numbers of the known signals for transmission path estimation in the information signal of the user channel and the information signal of the specific channel, and generating an orthogonal frequency division multiplexing transmit signal by performing inverse Fourier transform processing on the information signal of the user channel and the information signal of the specific channel.

\* \* \* \* \*